(12) United States Patent
Xu et al.

(10) Patent No.: US 11,871,039 B2
(45) Date of Patent: Jan. 9, 2024

(54) TRANSFORM SKIP RESIDUAL CODING

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Ye-kui Wang, San Diego, CA (US); Kai Zhang, San Diego, CA (US); Zhipin Deng, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/896,532

(22) Filed: Aug. 26, 2022

(65) Prior Publication Data

US 2023/0111133 A1    Apr. 13, 2023

Related U.S. Application Data

(63) Continuation of application No. PCT/CN2021/078010, filed on Feb. 26, 2021.

(Continued)

(51) Int. Cl.
*H04N 11/02* (2006.01)
*H04N 19/70* (2014.01)
(Continued)

(52) U.S. Cl.
CPC .......... *H04N 19/70* (2014.11); *H04N 19/132* (2014.11); *H04N 19/174* (2014.11); *H04N 19/18* (2014.11)

(58) Field of Classification Search
CPC .... H04N 19/70; H04N 19/132; H04N 19/174; H04N 19/18
(Continued)

(56) References Cited

U.S. PATENT DOCUMENTS

2016/0301931 A1    10/2016    Wen et al.
2017/0324981 A1    11/2017    Deshpande
(Continued)

FOREIGN PATENT DOCUMENTS

CN    107623853 A    1/2018
CN    108718414 A    10/2018
(Continued)

OTHER PUBLICATIONS

Document: JVET-Q2001-vC, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 508 pages.
(Continued)

*Primary Examiner* — Jayanti K Patel
*Assistant Examiner* — Richard B Carter
(74) *Attorney, Agent, or Firm* — Conley Rose, P.C.

(57) ABSTRACT

Several techniques for video encoding and video decoding are described. One example method includes performing a conversion between a video including a video unit and a bitstream of the video according to a rule, wherein the rule specifies whether a transform skip residual coding operation is enabled for the video unit, and wherein one or more syntax elements are included in the bitstream at a video segment level indicative of whether the transform skip residual coding operation is enabled for the video unit.

20 Claims, 19 Drawing Sheets

Related U.S. Application Data

(60) Provisional application No. 62/982,657, filed on Feb. 27, 2020.

(51) Int. Cl.
  *H04N 19/132* (2014.01)
  *H04N 19/174* (2014.01)
  *H04N 19/18* (2014.01)

(58) Field of Classification Search
  USPC .................................................. 375/240.26
  See application file for complete search history.

(56) References Cited

U.S. PATENT DOCUMENTS

| | | | |
|---|---|---|---|
| 2018/0124462 | A1 | 5/2018 | Lim et al. |
| 2020/0077107 | A1 | 3/2020 | Deshpande |
| 2020/0154101 | A1 | 5/2020 | Li et al. |
| 2021/0044838 | A1 | 2/2021 | Chen |
| 2021/0092388 | A1* | 3/2021 | Sarwer ................ H04N 19/132 |
| 2021/0266548 | A1* | 8/2021 | Sarwer ................ H04N 19/122 |
| 2022/0353536 | A1 | 11/2022 | Samuelsson |
| 2022/0353537 | A1 | 11/2022 | Deshpande |
| 2022/0408095 | A1* | 12/2022 | Choi ..................... H04N 19/46 |
| 2023/0030970 | A1* | 2/2023 | Choi ..................... H04N 19/122 |
| 2023/0068704 | A1 | 3/2023 | Hendry |

FOREIGN PATENT DOCUMENTS

| | | | |
|---|---|---|---|
| WO | 2014053428 | A1 | 4/2014 |
| WO | 2019145262 | A1 | 8/2019 |
| WO | 2020057662 | A1 | 3/2020 |

OTHER PUBLICATIONS

Retrieved from the internet: https://vcgit.hhi.fraunhofer.de/jvet/VVCSoftware_VTM/-/archive/VTM-8.0/VVCSoftware_VTM-VTM-8.0.zip, Accessed Nov. 16, 2022.
"Series H: Audiovisual and Multimedia Systems Infrastructure of audiovisual services—Coding of moving Video High efficiency video coding," Recommendation ITU-T H.265, Feb. 2018, 692 pages.
Document: JVET-G1001-v1, Chen J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Retrieved from the internet: https://vcgit.hhi.fraunhofer.de/jvet/VVCSoftware_VTM.git, VTM software, Accessed Nov. 16, 2022, 3 pages.
Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
Document: JVET-S0071-v5, Katsumata, M., et al., "AHG12: Cleanup of subpicture layout signalling," Joint Video Experts Team (JVET) of ITU-T SG 16 WP 3 and ISO/IEC JTC 1/SC 29/WG 11 19th Meeting: by teleconference, Jun. 22-Jul. 1, 2020, 11 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-Q0186-v1, Lin, Z-Y., et al., "CE3-related: TB-level residual coding selection for lossless coding," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q0398, Sanchez, Y., et al., "AHG9: Sub-layer wise dependency in multi-layer," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-R0107-v2, Deshpande, S., et al., "AHG8/AHG9: On Temporal Sublayers Information," Joint Video Experts Team (JVET) of ITU-T SG 16 WP 3 and ISO/IEC JTC 1/SC 29/WG 11 18th Meeting: by teleconference, Apr. 15-24, 2020, 8 pages.
Foreign Communication From a Related Counterpart Application, International Application No. PCT/CN2021/087382, English Translation of International Search Report dated Jul. 15, 2021, 12 pages.
Foreign Communication From a Related Counterpart Application, International Application No. PCT/US2021/034259, International Search Report dated Aug. 31, 2021, 16 pages.
Foreign Communication From a Related Counterpart Application, International Application No. PCT/CN2021/078010, English Translation of International Search Report dated May 10, 2021, 15 pages.
Document: JVET-Software Manual, Bossen, F., et al., "VTM Software Manual," Joint Video Experts Team (JVET) of ITU-T SG16 WP3 and ISO/IEC JTC1/SC29/WG11, Feb. 22, 2020, 43 pages.
Non-Final Office Action dated Mar. 22, 2023, 26 pages, U.S. Appl. No. 17/994,748, filed Nov. 28, 2022.

\* cited by examiner

TRANSFORM SKIP RESIDUAL CODING

CROSS REFERENCE TO RELATED APPLICATIONS

This application is a continuation of International Patent Application No. PCT/CN2021/078010, filed on Feb. 26, 2021, which claims the priority to and benefits of U.S. Provisional Patent Application No. 62/982,657, filed on Feb. 27, 2020, and International Patent Application No. PCT/CN2020/083393, filed on Apr. 4, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In one example aspect, a video processing method is disclosed. The method includes performing a conversion between a video comprising a video unit and a bitstream of the video according to a rule, wherein the rule specifies whether a transform skip residual coding operation is enabled for the video unit, and wherein one or more syntax elements are included in the bitstream at a video segment level indicative of whether the transform skip residual coding operation is enabled for the video unit.

In another example aspect, a video processing method is disclosed. The method includes performing a conversion between a video comprising a video unit and a bitstream of the video, wherein the bitstream conforms to a format rule, and wherein the format rule specifies whether or where one or more syntax elements indicative of one or more initial quantization parameter (QP) values used during the conversion are included in the bitstream.

In another example aspect, a video processing method is disclosed. The method includes determining, for a conversion between a chroma block of a video and a bitstream of the video, one or more chroma quantization parameter (QP) tables based on a type of a picture or a slice that includes the chroma block, wherein the one or more chroma QP tables are determined according to a rule; and performing the conversion based on the determining.

In another example aspect, a video processing method is disclosed. The method includes performing a conversion between a video comprising a video unit and a bitstream of the video according to a rule, wherein the rule specifies that a syntax element is included in a sequence parameter set (SPS) that indicates whether a current sequence to which the video unit belongs includes a B slice or a P slice.

In another example aspect, a video processing method is disclosed. The method includes performing a conversion between a chroma block of a video and a bitstream of the video according to a rule, wherein the rule specifies whether or how one set of chroma quantization parameter (QP) table or two sets of QP tables are included in a sequence parameter set (SPS) associated with the chroma block.

In another example aspect, a video processing method is disclosed. The method includes determining, for a conversion between a chroma block of a video and a bitstream of the video, one or more chroma quantization parameter (QP) tables based on a prediction mode for the chroma block; and performing the conversion based on the determining.

In another example aspect, a video processing method is disclosed. The method includes performing a conversion between a video comprising video blocks and a bitstream of the video according to a rule, wherein the rule specifies that one or more chroma quantization parameter (QP) tables associated with a video block that is coded in a transform skip (TS) mode are different from QP tables of other video blocks coded without the TS mode.

In some embodiments of method 1500, the video block includes a luma video block.

In another example aspect, a video processing method is disclosed. The method includes determining, for a conversion between a video comprising a video block and a bitstream of the video, that a maximum allowed value of a syntax element for a chroma quantization parameter (QP) table start point is 37; and performing the conversion based on the determining.

In another example aspect, a video processing method is disclosed. The method includes determining, for a conversion between a video comprising a video block and a bitstream of the video, that a syntax element for a chroma quantization parameter (QP) table start point is offset by K, wherein K is less than 26; and performing the conversion based on the determining.

In another example aspect, a video processing method is disclosed. The method includes performing a conversion between a video comprising a video block and a bitstream of the video according to a rule that specifies a property of a chroma quantization parameter (QP) table for the video block.

In another example aspect, a video processing method is disclosed. The method includes determining, for a conversion between a video comprising a video block and a bitstream of the video, that the bitstream excludes a syntax element that indicates a usage of a chroma adaptive loop filter (ALF) or cross component adaptive loop filter (CC-ALF) for a current coding tree unit (CTU) to which the video block belongs when a luma ALF is disabled for the current CTU; and performing the conversion based on the determining.

In another example aspect, a video processing method is disclosed. The method includes performing a conversion between a video comprising video pictures and a coded representation of the video, wherein the coded representation conforms to a format rule, wherein the format rule specifies whether and where one or more syntax elements indicative of one or more initial quantization parameter (QP) values used during the conversion are included in the coded representation. In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclosed. The code embodies one of the methods described herein in the form of processor-executable code.

These, and other, features are described throughout the present document.

DETAILED DESCRIPTION

Figure 1:
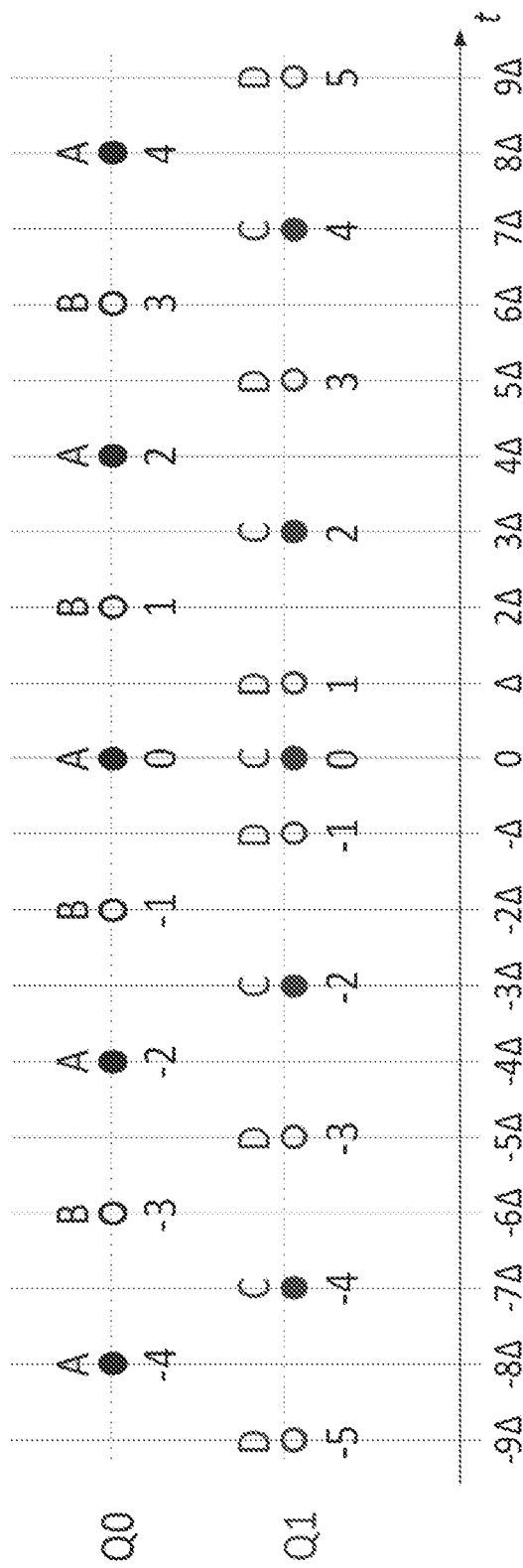
FIG. 1 is an illustration of the two scalar quantizers used in dependent quantization.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. SUMMARY

This disclosure is related to video coding technologies. Specifically, it is related to initial quantization parameter (QP) and chroma QP table in video coding. The techniques in this disclosure may be applied to the existing video coding standard like high efficiency video coding (HEVC), or the versatile video coding (VVC) standard to be finalized. The techniques in this disclosure may be also applicable to future video coding standards or video codec.

2. ABBREVIATIONS

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
QP Quantization Parameter
RBSP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding

3. VIDEO CODING INTRODUCTION

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 8) can be found at:
http://phenix.int-evry.fr/jvet/doc_end_user/documents/17_Brussels/wg11/JVET-Q2001-v13.zip And the latest test model software can be found at:
https://vcgit.hhi.fraunhofer.de/jvet/VVCSoftware_VTM/-/archive/VTM-8.0/VVCSoftware_VTM-VTM-8.0.zip 3.1. Quantization Parameter Control In VVC, Maximum QP was extended from 51 to 63, and the signalling of initial QP was changed accordingly. The initial value of SliceQpY is modified at the slice segment layer when a non-zero value of slice_qp_delta is coded. Specifically, the value of init_qp_minus26 is modified to be in the range of (−26+QpBdOffsetY) to +37. When the size of a transform block is not a power of 4, the transform coefficients are processed along with a modification to the QP or QP levelScale table rather than by multiplication by 181/256 (or 181/128), to compensate for an implicit scaling by the transform process. For transform skip block, minimum allowed Quantization Parameter (QP) is defined as 4 because quantization step size becomes 1 when QP is equal to 4.

In HEVC (and also in H.264), a fixed look-up table is used to convert the luma quantization parameter QPY to chroma quantization parameter QPC. In VVC, a more flexible luma-to-chroma QP mapping is used. Instead of having a fixed table, the luma-to-chroma QP mapping relationship is signalled in the SPS using a flexible piecewise linear model, with the only constraint on the linear model being that the slope of each piece cannot be negative (i.e., as luma QP increases, chroma QP must stay flat or increase, but cannot decrease). The piecewise linear model is defined by: 1) the number of pieces in the model; 2) input (luma) and output (chroma) delta QPs for that piece. The input range of the piecewise linear model is [−QpBdOffsetY, 63] and the output range of the piecewise linear model is [−QpBdOffsetC, 63]. The QP mapping relationship can be signalled separately for blue difference chroma component (Cb), red difference chroma component (Cr), and joint Cb/Cr coding, or signalled jointly for all three types of residual coding.

Same as in HEVC, coding unit (CU)-level QP adaptation is allowed in VVC. Delta QP values for luma and chroma components can be signalled separately. For the chroma components, the allowed chroma QP offset values are signalled in the form of offset lists in the PPS in a similar manner as in HEVC. The lists are defined separately for Cb, Cr and joint Cb/Cr coding. Up to 6 offset values are allowed for each of Cb, Cr, and joint Cb/Cr lists. At the CU-level, an index is signalled to indicate which one of the offset values in the offset list is used to adjust the chroma QP for that CU. CU chroma QP offset signalling is also consistent with the virtual pipeline data unit (VPDU) CU QP delta availability, and for CU larger than 64×64, send the chroma QP offset with the first transform unit regardless of whether it has non-zero coded block flag (CBF) or not.

3.2. Dependent Quantization

In addition, the same HEVC scalar quantization is used with a new concept called dependent scalar quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

The two scalar quantizers used, denoted by Q0 and Q1, are illustrated in FIG. 1. The location of the available reconstruction levels is uniquely specified by a quantization step size Δ. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 2:
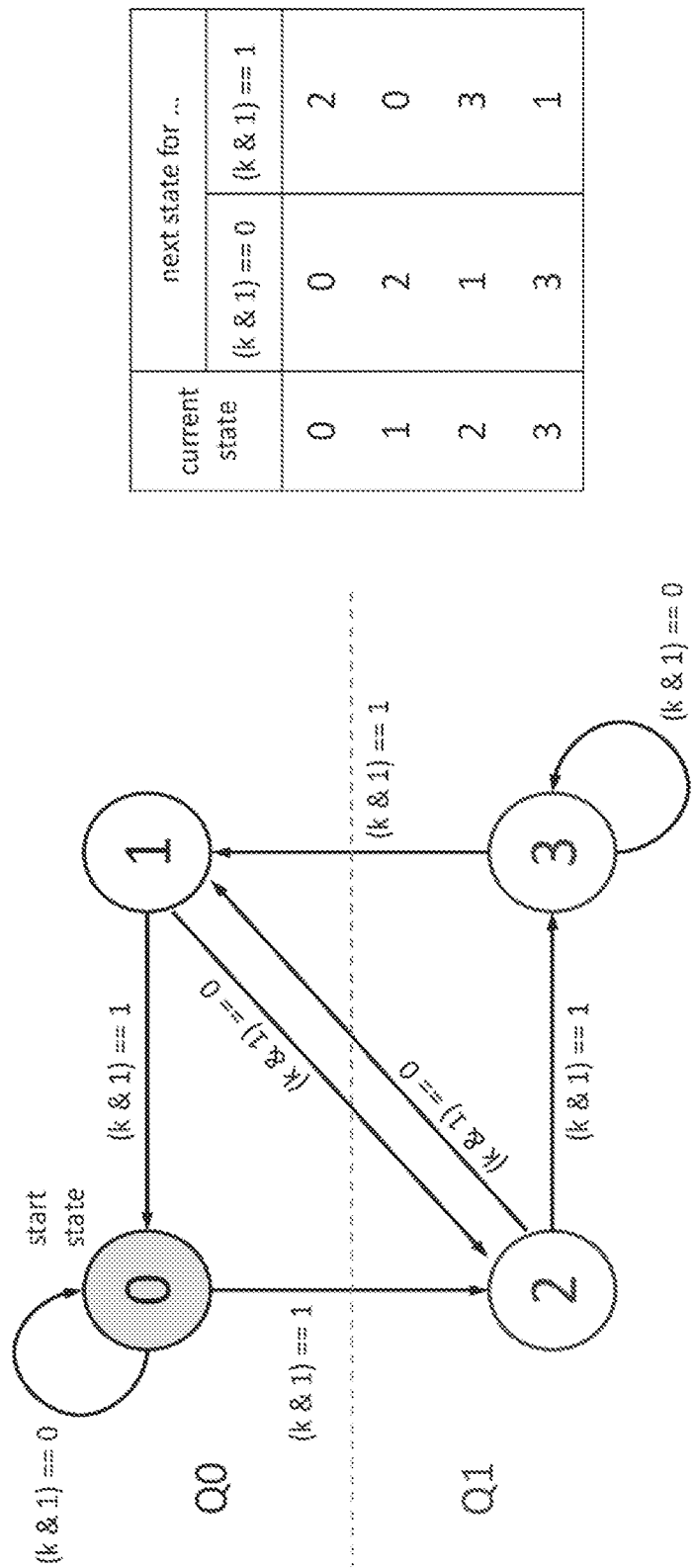
FIG. 2 shows an example of state transition and quantizer selection for dependent quantization.

As illustrated in FIG. 2, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 2, where k denotes the value of the transform coefficient level.

3.3. Scaling Matrices

VVC supports to use the default scaling matrices or signal user-defined scaling matrices. The DEFAULT mode scaling matrices are all flat, with elements equal to 16 for all transform block (TB) sizes. Intra block copy (IBC) and intra coding modes currently share the same scaling matrices. Thus, for the case of USER_DEFINED matrices, the number of MatrixType and MatrixType_DC are updated as follows:

MatrixType: 30=2 (2 for intra&IBC/inter)×3 (Y/Cb/Cr components)×5 (square TB size: from 4×4 to 64×64 for luma, from 4×4 to 32×32 for chroma)

MatrixType_DC: 14=2 (2 for intra&IBC/inter×1 for Y component)×3 (TB size: 16×16, 32×32, 64×64)+4 (2 for intra&IBC/inter×2 for Cb/Cr components)×2 (TB size: 16×16, 32×32)

The direct current (DC) values are separately coded for following scaling matrices: 16×16, 32×32, and 64×64. For TBs of size smaller than 8×8, all elements in one scaling matrix are signalled. If the TBs have size greater than or equal to 8×8, only 64 elements in one 8×8 scaling matrix are signalled as a base scaling matrix. For obtaining square matrices of size greater than 8×8, the 8×8 base scaling matrix is up-sampled (by duplication of elements) to the corresponding square size (i.e. 16×16, 32×32, 64×64). when the zeroing-out of the high frequency coefficients for 64-point transform is applied, corresponding high frequencies of the scaling matrices are also zeroed out. That is, if the width or height of the TB is greater than or equal to 32, only left or top half of the coefficients is kept, and the remaining coefficients are assigned to zero. Moreover, the number of elements signalled for the 64×64 scaling matrix is also reduced from 8×8 to three 4×4 submatrices, since the bottom-right 4×4 elements are never used. In VVC, 2×2, 2×4, and 4×2 chroma intra coding blocks (CBs) do not exist, and the smallest intra block size is equal to 2×8 and 8×2, as well as the smallest chroma intra block copy (IBC) block size. Furthermore, inter-prediction is disabled for 4×4 luma CBs. Therefore, small 2×2 chroma blocks can be created only by applying a subblock transform (SBT). Considering these essences, 2×2 intra chroma quantization matrices (QMs) are removed from the default QM list, and not code user-defined intra QMs for this size.

In order to improve coding efficiency for user defined quantization matrixes (QM), following approaches are considered.

Allow referencing a previously coded QM with the same base size as the current QM.

Allow coding element-to-element differences between the current QM and the reference QM.
Keep the original DPCM coding of elements within the current QM.
Use a single matrix identifier scalingListId which combines matrixId and sizeId.

Otherwise (mode is equal to 3, i.e., single residual, reconstruction Cr=C, Cb=(CSign*C)/2), the joint residual is determined according to $$resJointC[x][y]=(4*resCr[x][y]+2*CSign*resCb[x][y])/5$$

TABLE 1

Reconstruction of chroma residuals. The value CSign is a sign value (+1 or −1), which is specified in the slice header, resJointC[ ][ ] is the transmitted residual.

| tu_cbf_cb | tu_cbf_cr | reconstruction of Cb and Cr residuals | mode |
|---|---|---|---|
| 1 | 0 | resCb[ x ][ y ] = resJointC[ x ][ y ]<br>resCr[ x ][ y ] = ( CSign * resJointC[ x ][ y ] ) >> 1 | 1 |
| 1 | 1 | resCb[ x ][ y ] = resJointC[ x ][ y ]<br>resCr[ x ][ y ] = CSign * resJointC[ x ][ y ] | 2 |
| 0 | 1 | resCb[ x ][ y ] = ( CSign * resJointC[ x ][ y ] ) >> 1<br>resCr[ x ][ y ] = resJointC[ x ][ y ] | 3 |

3.4. Joint Coding of Chroma Residuals

VVC supports a mode where the chroma residuals are coded jointly; this is named as Joint Coding of Chroma Residuals (JCCR). The usage (activation) of a joint chroma coding mode is indicated by a transform unit (TU)-level flag tu_joint_cbcr_residual_flag and the selected mode is implicitly indicated by the chroma CBFs. The flag tu_joint_cbcr_residual_flag is present if either or both chroma CBFs for a TU are equal to 1. In the PPS and slice header, chroma QP offset values are signalled for the joint chroma residual coding mode to differentiate from the usual chroma QP offset values signalled for regular chroma residual coding mode. These chroma QP offset values are used to derive the chroma QP values for those blocks coded using the joint chroma residual coding mode. When a corresponding joint chroma coding mode (modes 2 in the following table) is active in a TU, this chroma QP offset is added to the applied luma-derived chroma QP during quantization and decoding of that TU. For the other modes (modes 1 and 3 in the following table), the chroma QPs are derived in the same way as for conventional Cb or Cr blocks. The reconstruction process of the chroma residuals (resCb and resCr) from the transmitted transform blocks is depicted in Table 1. When this mode is activated, one single joint chroma residual block (resJointC[x][y] in the following table) is signalled, and residual block for Cb (resCb) and residual block for Cr (resCr) are derived considering information such as tu_cbf_cb, tu_cbf_cr, and CSign, which is a sign value specified in the slice header.

At the encoder side, the joint chroma components are derived as explained in the following. Depending on the mode (listed in the tables above), resJointC{1,2} are generated by the encoder as follows:

If mode is equal to 2 (single residual with reconstruction Cb=C, Cr=CSign*C), the joint residual is determined according to $$resJointC[x][y]=(resCb[x][y]+CSign*resCr[x][y])/2$$

Otherwise, if mode is equal to 1 (single residual with reconstruction Cb=C, Cr=(CSign*C)/2), the joint residual is determined according to $$resJointC[x][y]=(4*resCb[x][y]+2*CSign*resCr[x][y])/5$$

The three joint chroma coding modes described above are only supported in intra coded slices (I slices). In unidirectional inter coded slices (P) and bi-directional inter coded slices (B slices), only mode 2 is supported. Hence, in P and B slices, the syntax element tu_joint_cbcr_residual_flag is only present if both chroma CBFs are 1. Note that transform depth is removed in the context modeling of tu_cbf_luma and tu_cbf_cb.

3.5. Chroma QP Table in SPS

In clause 7.3.2.3 of JVET-Q2001-vC, the SPS includes a structure named chroma QP table, shown as follows:

| seq_parameter_set_rbsp( ) { | Descriptor |
|---|---|
|   if( ChromaArrayType != 0 ) { | |
|     sps_joint_cbcr_enabled_flag | u(1) |
|     same_qp_table_for_chroma | u(1) |
|     numQpTables = same_qp_table_for_chroma ? 1 :<br>( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
| } | |

They are with the following semantics and QP table derivation:
sps_joint_cbcr_enabled_flag equal to 0 specifies that the joint coding of chroma residuals is disabled. sps_joint_cbcr_enabled_flag equal to 1 specifies that the joint coding of chroma residuals is enabled. When not present, the value of sps_joint_cbcr_enabled_flag is inferred to be equal to 0.
same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
        ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63, ChromaQpTable[ i ][ k + 1 ] − 1 )
for( j = 0; j <= num_points_in_qp_table_minus1[ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ] [j + 1] − qpOutVal[ i ] [j ] ) * m + sh ) /
            ( delta_qp_in_val_minusl[ i ][j] + 1 )
}
for( k = qpInVal[ i ][ num_points_in_qp_table_minus1[ i ] + 1 ] + 1; k <= 63; k++ )
    ChromaQpTable[ i ][ k ] = Clip3( −QpBdOffset, 63, ChromaQpTable[ i ][ k − 1 ] + 1 )
```

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive.

In the above description, QpBdOffset is derived as:

bit_depth_minus8 specifies the bit depth of the samples of the luma and chroma arrays, BitDepth, and the value of the luma and chroma quantization parameter range offset, QpBdOffset, as follows:

$$BitDepth = 8 + bit\_depth\_minus8$$

$$QpBdOffset = 6 * bit\_depth\_minus8$$

bit_depth_minus8 shall be in the range of 0 to 8, inclusive.

3.6. Initial QP in PPS

There is a syntax element, named init_qp_minus26, in PPS. The semantics is as follows:

init_qp_minus26 plus 26 specifies the initial value of SliceQp$_Y$ for each slice referring to the PPS. The initial value of SliceQp$_Y$ is modified at the picture level when a non-zero value of ph_qp_delta is decoded or at the slice level when a non-zero value of slice_qp_delta is decoded. The value of init_qp_minus26 shall be in the range of −(26+QpBdOffset) to +37, inclusive.

When qp_delta_info_inph_flag is equal to 1, the initial value of the Qp$_Y$ quantization parameter for all slices of the picture, SliceQp$_Y$, is derived as follows:

$$SliceQp_Y = 26 + init\_qp\_minus26 + ph\_qp\_delta$$

When qp_delta_info_in_ph_flag is equal to 0, the initial value of the Qp$_Y$ quantization parameter for the slice, SliceQp$_Y$, is derived as follows:

$$SliceQp_Y = 26 + init\_qp\_minus26 + slice\_qp\_delta$$

The value of SliceQp$_Y$ shall be in the range of −QpBdOffset to +63, inclusive.

4. TECHNICAL PROBLEMS SOLVED BY DISCLOSED TECHNICAL SOLUTIONS AND EMBODIMENTS

1. The signalling of the initial QP value (i.e., init_qp_minus26) may not be reasonable.
2. I and B/P pictures or slices may need different chroma QP tables, however, they share the same in the current VVC draft text.
3. Transform skip may need another chroma QP table.
4. Chroma QP table start point should cover the whole QP range which is not the case in the current design.
5. Chroma QP table may have a biased start point.
6. The number of points in a chroma QP table should be able to be 0, but this is disallowed in the current design since the num_points_in_qp_table_minus1 is coded and the minimum allowed value of the syntax element is equal to 0 and consequently the minimum number of points is 1.
7. Specifying a QP clipping in the derivation of chroma QP may be better than specifying a bitstream conformance constraint for limiting the derived chroma QP value, as the former would prevent a violation from happening.

8. In the latest VVC draft text, the slice header (SH) syntax element slice_ts_residual_coding_disabled_flag is used to specify whether transform skip based residual coding (TSRC) or regular residual coding (RRC) is used for a transform bock. However, there might be higher-level (SPS/PPS) and/or lower-level (CU/TU) level control flags for whether the current block is using TSRC or RRC. Moreover, the interactions between different level control flags, and between the control flag and the transform skip flags would be further specified.

9. In current VVC, chroma ALF and CC-ALF are disabled implicitly when luma ALF is disabled at SPS/PH/SH. However, such a restriction is not applied at CTU level. When luma ALF is disabled for a CTU, the chroma ALF and CC-ALF may still be applied for the CTU. Such a design is conflicting with the intention of controlling chroma ALF/CC-ALF based on luma ALF at higher levels.

5. EXAMPLE LISTING OF EMBODIMENTS AND SOLUTIONS

To solve the above problems, and others, methods as summarized below are disclosed. The items should be considered as examples to explain the general concepts and should not be interpreted in a narrow way. Furthermore, these items can be applied individually or combined in any manner.

In the following, floor(x) denotes a function that returns the greatest integer that is less than or equal to x.

1. The initial QP value syntax element, which is used to specify the initial QP values, e.g., currently denoted as init_qp_minus26 in JVET-Q2001-vC, in PPS may be moved to PH.
   a. Alternatively, the initial QP value syntax element may be repeated at PH.
   b. Alternatively, the initial QP value syntax element may be signalled in both PPS and PH, and the initial QP value syntax element signalled in PH may override or update (by adding the signalled delta) the initial QP value syntax element signalled in PPS.
   c. Alternatively, the initial QP value syntax element may be signalled in the SPS, possibly also signalled in one or more of the PPS, PH, and SH, and when present, the value at a lower level overrides or updates (by adding the signalled delta) the value signalled at a higher level. In the case of updating, the initial QP value signalled at the highest level is ue(v) coded, and the delta values signalled in the lower levels are se(v) coded.

2. Multiple syntax elements for indications of initial QP values may be signalled in SPS/PPS/PH/SH according to specific types.
   a. In one example, each of them may be corresponding to a specific type.
   b. In one example, the specific type may include a picture/slice type (e.g., I/P/B; Intra/Inter).
   c. In one example, the specific type may include a video content type (e.g., screen content or camera captured content).
   d. In one example, the specific type may include an index of a subpicture or other subpicture identification information, i.e., different subpictures may be associated with different syntax elements for initial QPs derivation.
   e. In one example, the specific type may include an index of a slice or other slice identification information, i.e., different slices may be associated with different syntax elements for initial QPs derivation.
   f. In one example, the specific type may include an index of a tile or other tile identification information, i.e., different tiles may be associated with different syntax elements for initial QPs derivation.
   g. In one example, the specific type may include a transform type. (e.g., transform skip mode or not transform skip mode).

3. The initial QP value syntax element (e.g., in SH/PH/PPS/SPS) may be offset by a number K not equal to 26.
   a. In one example, K is smaller than 26.
   b. In one example, the syntax element may be replaced by init_qp_minusK and/or the value of the syntax element shall be in the range of $-(K+QpBdOffset)$ to $(63-K)$, inclusive, where K is smaller than 26.
      i. In one example, K is equal to 20. Alternatively, furthermore, the syntax element may be replaced by init_qp_minus20 and/or the value of the syntax element shall be in the range of $-(20+QpBdOffset)$ to 43 (i.e., 63−20), inclusive.
   c. In one example, K is larger than 26.
      i. In one example, the syntax element may be replaced by init_qp_minusK, and the value of the syntax element shall be in the range of $-(K+QpBdOffset)$ to $(63-K)$, inclusive, where K is a constant larger than 26.
      ii. In one example, K is equal to 32. Alternatively, furthermore, the syntax element may be replaced by init_qp_minus32 and the value of the syntax element shall be in the range of $-(32+QpBdOffset)$ to 31 (i.e., 63−32), inclusive.
   d. Alternatively, K may be set to a function of the maximum allowed QP and/or the minimum allowed QP. For example, K may be set equal to (the maximum allowed QP−the minimum allowed QP)/2 or (the maximum allowed QP+1−the minimum allowed QP)/2.
   e. In above example, K may be dependent on picture/slice/block types; and/or prediction modes and/or bit depth.
      i. In one example, the value of K for an I slice/picture is no greater than that for a PB slices/pictures.

4. The initial QP value syntax element (e.g., in SH/PH/PPS) may be offset by a number dependent on the internal bit depth.
   a. In one example, the initial QP value syntax element may be offset by floor((−QpBdOffset+M)/2).
      i. Alternatively, furthermore, the value of the syntax element plus floor((−QpBdOffset+M)/2) shall be in the range of −QpBdOffset to 63, inclusive.
   b. In one example, the initial QP value syntax element may be offset by (floor((−QpBdOffset+M)/2)+K), where K is a constant number.
      i. Alternatively, furthermore, the value of the syntax element plus (floor((−QpBdOffset+M)/2)+K) shall be in the range of −QpBdOffset to N, inclusive.
   c. In above examples, N may be set to the maximum allowed QP value (e.g., 63).

d. In above examples, M may be set to the maximum allowed QP value (e.g., 63) or maximum allowed QP value plus/minus 1.
5. Chroma QP tables may be determined according to picture/slice types.
   a. In one example, different picture/slice types may have different sets of chroma QP tables.
   b. In one example, I pictures/slices may have their own chroma QP tables.
   c. In one example, I and B and P pictures/slices may each have their own chroma QP tables.
   d. In one example, B and P pictures/slices may share the same set of chroma QP tables.
   e. In one example, the picture/slice types may be classified to M cases (M=2 for I only, BP share; M=3 for I/B/P separate). the number of chroma QP tables to be signalled may be dependent on M.
      i. In one example, number of chroma QP tables to be signalled may be set to M*numQpTables wherein (numQpTables=same_qp_table_for_chroma ? 1:(sps_joint_cbcr_enabled_flag ? 3:2)) wherein M is greater than 1.
         1) Alternatively, furthermore, the semantics of same_qp_table_for_chroma may be further modified to 'same_qp_table_for_chroma equal to 1 specifies that only one chroma QP mapping table is signalled for a picture/slice type'.
      ii. In one example, furthermore, number of chroma QP tables to be signalled may be set to (same_qp_table_for_chroma ? 1:(M*(sps_joint_cbcr_enabled_flag ? 3:2))) wherein M is greater than 1.
      iii. In one example, for each category, an indication of whether all blocks share the same chroma QP tables is firstly signalled, and number of QP tables may be set to (same_qp_table_for_chroma ? 1:(sps_joint_cbcr_enabled_flag ? 3:2)), followed by detailed information of chroma QP tables.
         1) Alternatively, furthermore, for all categories, indications of the starting luma and chroma QP used to describe a chroma QP mapping table may be further signalled, such as using the actual value minus K (e.g., K=26).
         2) Alternatively, furthermore, indications of the starting luma and chroma QP used to describe a chroma QP mapping table may be further signalled, such as using the actual value minus K (e.g., K=1 for intra slices/pictures or K=32 for inter slices/pictures) and K depending on category index.
6. An indication, e.g., sps_non_intra_present_flag, may be added into SPS to indicate if the current sequence may contain B/P slices.
   a. In one example, when the flag is 1, it indicates that all slices in the current sequences are of intra slices.
   b. In one example, when the flag is 0, it indicates that there may be B/P slices in the current sequence.
7. Either one or two sets of chroma QP tables may be signalled in the SPS.
   a. A flag is added to the SPS, e.g., named sps_one_set_of_chroma_qp_tables_flag.
   b. sps_one_set_of_chroma_qp_tables_flag equal to 1 specifies the presence of one set of chroma QP tables in the SPS (i.e., as in the current VVC draft text), and this set of chroma QP tables only applies to intra coded entities (pictures, slices, CTUs, CUs, or coded blocks).
      i. In one example, the only set of chroma QP tables applies only to intra pictures (for which all slices are intra slices, i.e., I slices) in CLVSs referring to the SPS.
      ii. In one example, the only set of chroma QP tables applies only to intra slices in CLVSs referring to the SPS.
      iii. In one example, the only set of chroma QP tables applies only to intra CTUs in CLVSs referring to the SPS.
      iv. In one example, the only set of chroma QP tables applies only to intra CUs in CLVSs referring to the SPS.
      v. In one example, the only set of chroma QP tables applies only to intra coded blocks in CLVSs referring to the SPS.
   c. sps_one_set_of_chroma_qp_tables_flag equal to 1 specifies the presence of one set of chroma QP tables in the SPS (i.e., as in the current VVC draft text), and this set of chroma QP tables applies to both intra and inter coded entities (pictures, slices, CTUS, CUs, or coded blocks).
   d. sps_one_set_of_chroma_qp_tables_flag equal to 0 specifies the presence of two set of chroma QP tables in the SPS (i.e., adding one more set of chroma QP tables), the 0-th set of chroma QP tables only applies to intra coded entities (pictures, slices, CTUS, CUs, or coded blocks), and the 1-th set of chroma QP tables only applies to inter coded entities (pictures, slices, CTUs, CUs, or coded blocks).
      i. In one example, the 0-th set of chroma QP tables applies only to intra pictures (for which all slices are intra slices) in CLVSs referring to the SPS, and the 1-th set of chroma QP tables applies only to inter pictures (for which all slices are inter slices, i.e., B or P slices) in CLVSs referring to the SPS.
      ii. In one example, the 0-th set of chroma QP tables applies only to intra slices in CLVSs referring to the SPS, and the 1-th set of chroma QP tables applies only to inter slices in CLVSs referring to the SPS.
      iii. In one example, the 0-th set of chroma QP tables applies only to intra CTUs in CLVSs referring to the SPS, and the 1-th set of chroma QP tables applies only to inter CTUs in CLVSs referring to the SPS.
      iv. In one example, the 0-th set of chroma QP tables applies only to intra CUs in CLVSs referring to the SPS, and the 1-th set of chroma QP tables applies only to inter CUs in CLVSs referring to the SPS.
      v. In one example, the 0-th set of chroma QP tables applies only to intra coded blocks in CLVSs referring to the SPS, and the 1-th set of chroma QP tables applies only to inter coded blocks in CLVSs referring to the SPS.
   e. The flag may be sent only when ChromaArrayType is not equal to 0.
   f. An exemplar implementation is shown in embodiment 4.
   g. Another exemplar implementation is shown in embodiment 5.
8. Chroma QP tables may be determined according to prediction modes.
   a. In one example, intra CUs and other CUs may have a different set of chroma QP tables.
      i. In one example, it may only apply on dual tree and/or local dual tree.

b. Alternatively, intra/palette CUs and other CUs may have a different set of chroma QP tables.
c. Alternatively, intra/IBC/palette CUs and other CUs may have a different set of chroma QP tables.
d. Alternatively, intra/IBC CUs and other CUs may have a different set of chroma QP table.
e. In above examples, the number of chroma QP tables to be signalled may be dependent on number of the classified sets of prediction modes.
f. In above examples, the prediction mode may mean the prediction mode of the luma CB.

9. Transform skip blocks may have a different set of chroma QP tables.
   a. In one example, it may only apply to luma blocks coded in transform skip mode.

10. The maximum allowed value of the chroma QP table start point syntax element, i.e., currently denoted as qp_table_start_minus26 in JVET-Q2001-vC, may be 37.

11. The chroma QP table start point syntax element, i.e., currently denoted as qp_table_start_minus26 in JVET-Q2001-vC, may be offset by a number K smaller than 26.
   a. In one example, the syntax element may be replaced by qp_table_start_minusK and/or the value of the syntax element plus K shall be in the range of −(K+QpBdOffset) to (M−K), inclusive, where K is smaller than 26.
   b. In one example, the syntax element may be replaced by qp_table_start_minusK and/or the value of the syntax element shall be in the range of −(K+QpBdOffset) to (M−1−−−K), inclusive, where K is smaller than 26.
      i. In one example, K is equal to 20. Alternatively, furthermore, the syntax element may be replaced by init_qp_minus20 and/or the value of the syntax element plus 20 shall be in the range of −(20+QpBdOffset) to (M−20), inclusive.
      ii. In one example, K is equal to 20. Alternatively, furthermore, the syntax element may be replaced by init_qp_minus20 and/or the value of the syntax element plus 20 shall be in the range of −(20+QpBdOffset) to (M−1−20), inclusive.
   c. Alternatively, the initial QP value syntax element may be offset by a number K larger than 26.
      i. In one example, the syntax element may be replaced by init_qp_minusK, and the value of the syntax element plus K shall be in the range of −(K+QpBdOffset) to (M−K), inclusive, where K is a constant larger than 26.
      ii. In one example, the syntax element may be replaced by init_qp_minusK, and the value of the syntax element plus K shall be in the range of −(K+QpBdOffset) to (M−1−K), inclusive, where K is a constant larger than 26.
         1) In one example, K is equal to 32. Alternatively, furthermore, the syntax element may be replaced by init_qp_minus32 and the value of the syntax element plus 32 shall be in the range of −(32+QpBdOffset) to (M−32), inclusive.
         2) In one example, K is equal to 32. Alternatively, furthermore, the syntax element may be replaced by init_qp_minus32 and the value of the syntax element plus 32 shall be in the range of −(32+QpBdOffset) to (M−1−32), inclusive.
   d. In above example, K may be dependent on picture/slice types; and/or prediction modes and/or bit depth.
      i. In one example, for Intra picture/slices, K is set to 1.
      ii. In one example, for PB picture/slices, K is set to 32.
   e. In above example, M may be the maximum allowed QP value, e.g., 63.
   f. In one example, K is 0.
      i. Alternatively, furthermore, the syntax element may be binarized with uv(e) instead of sv(e).

12. The chroma QP table start point syntax element, i.e., currently denoted as qp_table_start_minus26 in NET-Q2001-vC, may be offset by a value depend on if the current picture is intra only picture.
   a. Alternatively, the offset may depend on intra_only_constraint_flag.

13. The syntax element related to the number of pivot points in a chroma QP table, i.e., currently denoted as num_points_in_qp_table_minus1, should be able to present 0 number of points.
   a. In one example, the syntax element num_points_in_qp_table_minus1, may be replaced by num_points_in_qp_table that is used to specify the number of points in a chroma QP table and the value is a non-negative integer.
      i. In one example, the value of the syntax element that denotes the number of pivot points shall be in the range of 0 to (63+QpBdOffset).
   b. Alternatively, furthermore, when number of pivot points in a chroma QP table is zero, the i-th entry of a chroma QP table is set equal to the i-th entry of a luma QP table.
   c. Alternatively, furthermore, when number of pivot points in a chroma QP table is zero, the i-th entry of a chroma QP table is set equal to (the i-th entry of a luma QP table plus an offset).
      i. In one example, the offset may be dependent on the coded method (e.g., JCCR on or off)

14. Parsing of the chroma QP table start point syntax element, i.e., currently denoted as qp_table_start_minus26 in JVET-Q2001-vC, may be conditional on if the number of pivot points is 0 or not.
   a. In one example, when the number of pivot points is 0, parsing of the syntax element may be skipped.

15. In the derivation process of the chroma QP table, the exclusive or (XOR) operator should be performed between (delta_qp_in_val_minus1[i][j]+1) and delta_qp_diff_val[i][j].
   a. An example is shown in embodiment 3.

16. A QP clipping may be always applied to the chroma QP table index.
   a. In one example, the clipping range is from −QpBdOffset to 63, inclusive.

17. A QP clipping may be always applied to the mapped chroma QPs in a chroma QP table.
   a. In one example, the clipping range is from −QpBdOffset to 63, inclusive.

18. Chroma QP tables may be signalled in both SPS and PPS.
   a. In one example, chroma QP table in PPS may overwrite the corresponding table in SPS.

19. Chroma QP tables may be signalled in PH or SH.
   a. In one example, chroma QP table in PH or SH may overwrite the corresponding table in SPS or PPS.

20. Regarding the control of RRC and TSRC for solving the eighth problem, one or more of the following approaches are disclosed, e.g., as in the seventh set of embodiments:

a. In one example, whether to allow TSRC for a video unit (CLVS/group of pictures/picture/slice/tile/CTU row/CTU/CU/PU/TU) may be dependent on syntax elements (e.g., one or more flags) signalled in the SPS/PPS/PH/SH/block/CU/TU-level.
  i. For example, the TSRC enabling/disabling flag may be signalled either in the PH or the SH, but not both,
    1) Additionally, whether to signalled the TSRC enabling/disabling flag in the PH or the SH may be dependent on a syntax flag signalled in the PPS/SPS.
    2) Additionally, when the TSRC enabling/disabling flag is signalled in the PH, then the TSRC enabling/disabling flag in the SH is not signalled.
    3) Additionally, when the TSRC enabling/disabling flag in the SH is not present, it is inferred to be equal to the TSRC enabling/disabling flag in the PH.
  ii. Alternatively, the TSRC enabling/disabling flags may be signalled in both the PH and SH.
    1) Additionally, furthermore, the TSRC enabling/disabling flags in the SH may be not signalled when the TSRC enabling/disabling flags in the PH specifying that the TSRC is disabled for all slices referring to the PH.
  iii. For example, the block/CU/TU-level TSRC enabling/disabling flag is coded with context-adaptive arithmetic entropy-coded syntax element, such as ae(v) coding.
  iv. For example, the SPS/PPS/PH/SH-level TSRC enabling/disabling flag is coded with unsigned integer using n bits (e.g., u(1) coding), such as n=1.
b. Additionally, the signalling of the TSRC enabling/disabling flag for a video unit may be dependent on whether the transform skip is enabled/used for a video unit.
  i. For example, if the transform skip is disabled at the SPS-level (e.g., sps_transform_skip_enabled_flag is equal to 0), then the TSRC enabling/disabling flag in the PPS-level is required be equal to a certain value that specifying the TSRC is disabled for pictures referring to the current PPS.
  ii. Additionally, if the transform skip is disabled at a higher-level (e.g., sps_transform_skip_enabled_flag is equal to 0), then the TSRC enabling/disabling flags at the lower-level and/or same-layer (e.g., SPS/PH/SH/block/CU/TU-level) are not signalled.
  iii. Alternatively, furthermore, if the transform skip is enabled at a higher-level (e.g., SPS) but not used for a video unit (e.g., the TU-level transform_skip_flag is equal to 0), then the TSRC enabling/disabling flag of the current video unit (e.g., TU) is not signalled.
  iv. Additionally, when the TSRC enabling/disabling flag is not signalled at a video unit level, the value of the TSRC enabling/disabling flag is inferred to be a certain value that specifying the TSRC is disabled for the video unit.
c. Alternatively, furthermore, the signalling of the TSRC enabling/disabling flag at low-level may be dependent on the TSRC enabling/disabling flag at higher-level.
  i. For example, the signalling of the TSRC enabling/disabling flag at picture/slice level may be dependent on whether the TSRC is enabled at SPS/PPS-level.
  ii. Additionally, the signalling of the TSRC enabling/disabling flag at block/CU/TU level may be dependent on whether the TSRC is enabled at SPS/PPS/picture/slice-level.
    1) For example, when the TSRC is disabled at a higher-level (e.g., SPS/PPS/picture/slice-level), then the TSRC enabling/disabling flag at block/CU/TU level is not signalled.
    2) Additionally, furthermore, when the TSRC enabling/disabling flag is not present, it is inferred to a certain value (such as a value specifying the TSRC is disabled for the current video unit).
  iii. Additionally, the value of the TSRC enabling/disabling flag at PPS-level may be dependent on whether the TSRC is enabled at SPS-level.
    1) For example, when the SPS-level TSRC enabling/disabling flag specifies that the TSRC is disabled for the CLVS, then the value of the PPS-level TSRC enabling/disabling flag is required to be equal to a certain value that specifying the TSRC is disabled for pictures referring to the current PPS.

Regarding ALF and CC-ALF

21. It is proposed that indication of usage of chroma ALF/CC-ALF for a current CTU are not signaled when the luma ALF is disabled for the current CTU.
  a. Alternatively, furthermore, the usage is inferred to be false when luma ALF is disabled for a CTU. In other words, chroma ALF/CC-ALF are disabled when luma ALF is disabled in a CTU.

6. EMBODIMENTS

6.1. Embodiment 1: Chroma QP Tables According to Slice Type

The changes, marked in *bold italicized underlined* text, are based on JVET-Q2001-vC. And the deleted texts are marked in open and close double brackets (e.g., [[ ]]) indicating deleted text in between the double brackets.

7.3.2.3 Sequence Parameter Set RBSP Syntax

| seq_parameter_set_rbsp( ) { | Descriptor |
|---|---|
| *sps_non_intra_present_flag* | *u(1)* |
| if( ChromaArrayType != 0 ) { | |
| sps_joint_cbcr_enabled_flag | u(1) |
| *intra_* same_qp_table_for_chroma | u(1) |
| numQpTables*Intra* = *intra_* same_qp_table_for_chroma ? 1 : ( sps_joint_cbcr_enabled_flag ? 3 : 2 ) | |
| for( i = 0; i < numQpTables*Intra*; i++ ) { | |

-continued

| seq_parameter_set_rbsp( ) { | Descriptor |
|---|---|
|     *intra*_qp_table_start_minus26[ i ] | se(v) |
|     *intra*_num_points_in_qp_table_minus1[ i ] | ue(v) |
|     for( j = 0; j <= intra_num_points_in_qp_table_minus1[ i ]; j++) { | |
|         *intra*_delta_qp_in_val_minus1[ i ][ j ] | ue(v) |
|         *intra*_delta_qp_diff_val[ i ][ j ] | ue(v) |
|     } | |
|   } | |
|   *if( sps_non_intra_present_flag ) {* | |
|     inter_same_qp_table_for_chroma | u(1) |
|     numQpTablesInter = same_qp_table_for_chroma_inter ? | |
|     ( sps_joint_cbcr_enabled_flag ? 3 : 2 ) | |
|     for( i = 0; i < numQpTablesInter; i++ ) { | |
|         inter_qp_table_start_minus26[ i ] | se(v) |
|         inter_num_points_in_qp_table_minus1[ i ] | ue(v) |
|         for( j = 0; j <= inter_num_points_in_qp_table_minus1[ i ]; j++ ) { | |
|             inter_delta_qp_in_val minus1[ i ][ j ] | ue(v) |
|             inter_delta_qp_diff_val[ i ][ j ] | ue(v) |
|         } | |
|     } | |
|   } | |
| } | |

7.3.2.3 Sequence Parameter Set RBSP Syntax

. . .

[[same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1. same_qp_table_for_chroma equal to 0 specifies that chroma QP mapping tables, two for Cb and Cr, and one additional for joint Cb-Cr when sps_joint_cbcr_enabled_flag is equal to 1, are signalled in the SPS. When same_qp_table_for_chroma is not present in the bitstream, the value of same_qp_table_for_chroma is inferred to be equal to 1.]]

[[qp_table_start_minus26[i] plus 26 specifies the starting luma and chroma QP used to describe the i-th chroma QP mapping table. The value of qp_table_start_minus26[i] shall be in the range of −26−QpBdOffset to 36 inclusive. When qp_table_start_minus26[i] is not present in the bitstream, the value of qp_table_start_minus26[i] is inferred to be equal to 0.]]

[[num_points_in_qp_table_minus1[i] plus 1 specifies the number of points used to describe the i-th chroma QP mapping table. The value of num_points_in_qp_table_minus1[i] shall be in the range of 0 to 63+QpBdOffset, inclusive. When num_points_in_qp_table_minus1[0] is not present in the bitstream, the value of num_points_in_qp_table_minus1[0] is inferred to be equal to 0.]]

[[delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.]]

[[delta_qp_diff_val[i][j] specifies a delta value used to derive the output coordinate of the j-th pivot point of the i-th chroma QP mapping table.]]

[[The i-th chroma QP mapping table ChromaQpTable[i] for i=0 . . . numQpTables−1 is derived as follows:]]

sps_non_intra_present_flag equal to 0 specifies that all slices are of intra slice in the sequence. sps_non_intra_present_flag equal to 1 specific that there may be non intra slices present in the sequence.

*intra_same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1 for intra slices. intra_same_qp_table_for_chroma equal to 0 specifies that chroma QP mapping tables, two for Cb and Cr, and one additional for joint Cb-Cr when sps_joint_cbcr_enabled_flag is equal to 1, When intra qp table start minus26[i] is When same_qp_table_for_chroma is not present in the bitstream, the value of intra_same_qp_table_for_chroma is inferred to be equal to 1.*

*intra_qp_table_start_minus26[ i ] plus 26 specifies the starting luma and chroma QP used to describe the i-th chroma QP mapping table for intra slices. The value of intra_qp_table_start_minus26[ i ] shall be in the range of -26-QpBdOffset to 36 inclusive. When intra qp table start minus26[i] is not present in the bitstream, the value of intra_qp_table_start_minus26[ i ] is inferred to be equal to 0.*

*intra_num_points_in_qp_table_minus[i] plus 1 specifies the number of points used to describe the i-th chroma QP mapping table for intra slices. the value of intra_num_points_in_qp_table_minus1[ i ] shall be in the range of 0 to 63 + QpBdOffset, inclusive. When intra_num_points_in_qp_table_minus1[0] is not present in the bitstream, the value of intra_num_points_in_qp_table_minus1[ 0 ] is inferred to be equal to 0.*

*intra_delta_qp_in_val_minus1[i][j] specifies a delta value used to derive the input coordinate of the j-th pivot point of the i-th chroma QP mapping table for intra slices. When intra_delta_qp_in_val_minus1[ 0 ][ j ] is not present in the bitstream, the value of intra_delta_qp_in_val_minus1[ 0 ][ j ] is referred to be equal to 0.* intra_delta_qp_diff_val[i][j] specifies a delta value used to derive the output coordinate of the j-th pivot point of the i-th chroma QP mapping table for intra slices.

inter_same_qp_table_for_chroma equal to 1 specifies that only one chroma QP mapping table is signalled and this table applies to Cb and Cr residuals and additionally to joint Cb-Cr residuals when sps_joint_cbcr_enabled_flag is equal to 1 for B or P slices. inter_same_qp_table_for_chroma equal to 0 specifies that chroma QP mapping tables, two for Cb and Cr, and one additional for joint Cb-Cr when sps_joint_cbcr_enabled_flag is equal to 1, for B or P slices are signalled in the SPS. When same_qp_table_for_chroma is not present in the bitstream, the value of inter_same_qp_table_for_chroma is inferred to be equal to 1.

inter_qp_table_start_minus26[ i ] plus 26 specifies the starting luma and chroma QP used to describe the i-th chroma QP mapping table for B or P slices. The value of intra_qp_table_start_minus26[ i ] shall be in the range of -26 - QpBdOffset to 36 inclusive. When inter_qp_table_start_minus26[ i ] is not present in the bitstream, the value of inter_qp_table_start_minus26[ i ] is inferred to be equal to 0.

inter_delta_qp_in_val_minus1[ 0 ][ j ] is inferred to be equal to 0.

inter_delta_qp_diff_val[ i ][ j ] specifies a delta value used to derive the output coordinate of the j-th pivot point of the i-th chroma QP mapping table for B or P slices.

The i-th chroma QP mapping table IntraChromaQpTable[ i ] for i = 0..numQpTablesIntra - 1 and the i-th chroma QP mapping table InterChromaQpTable[ i ] for i = 0..numQpTablesInter -1 are derived as follows.

When intra_same_qp_table_for_chroma is equal to 1, IntraChromaQpTable[ 1 ][ k ] and IntraChromaQpTable[ 2 ][ k ] are set equal to IntraChromaQpTable[ 0 ][ k ] for k in the range of -QpBdOffset to 63, inclusive.

When inter_same_qp_table_for_chroma is equal to 1, InterChromaQpTable[ 1 ][ k ] and InterChromaQpTable[ 2 ][ k ] are set equal to InterChromaQpTable[ 0 ][ k ] for k in the range of -QpBdOffset to 63, inclusive.

Let ChromaQpTable[ i ] denote the IntraChromaQpTable[ i ] for I-slices for i = 0..numQpTablesIntra - 1 and InterChromaQpTable[ i ] for B- or P-slices for i = 0..numQpTablesInter - 1, the following applies

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
    ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] - 1; k >= -QpBdOffset; k - - )
    ChromaQpTable[ i ][ k ] = Clip3( -QpBdOffset, 63, ChromaQpTable[ i ][ k + 1 ] - 1 )
    (62)
for( j = 0; j <= num_points_in_qp_table_minus1[ i ]; j++ ) {
    sh = ( delta_qp_in_val_minus1[ i ][j] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ] [j + 1] - qpOutVal[ i ] [j ] ) * m + sh ) /
    ( delta_qp_in_val_minus1[ i ][j] + 1 )
}
for( k = qpInVal[ i ][ num_points_in_qp_table_minus1[ i ] + 1 ] + 1; k <= 63; k++ )
    ChromaQpTable[ i ][ k ] = Clip3( -QpBdOffset, 63, ChromaQpTable[ i ][ k - 1 ] + 1 )
``` inter_num_points_in_qp_table_minus1[ i ] plus 1 specifies the number of points used to describe the i-th chroma QP mapping table for B or P slices. The value of inter_num_points_in_qp_table_minus1[ i ] shall be in the range of 0 to 63 + QpBdOffset, inclusive. When inter_num_points_in_qp_table_minus1[ 0 ] is not present in the bitstream, the value of inter_num_points_in_qp_table_minus1[ 0 ] is inferred to be equal to 0.

inter_delta_qp_in_val_minus1[ i ][ j ] specifies a delta value used to derive the input coordinate of the j-th pivot point of the i-th chroma QP mapping table for B or P slices. When inter_delta_qp_in_val_minus1[ 0 ][ j ] is not present in the bitstream, the value of When same_qp_table_for_chroma is equal to 1, ChromaQpTable[1][k] and ChromaQpTable[2][k] are set equal to ChromaQpTable[0][k] for k in the range of –QpBdOffset to 63, inclusive.

It is a requirement of bitstream conformance that the values of qpInVal[i][j] and qpOutVal[i][j] shall be in the range of –QpBdOffset to 63, inclusive for i in the range of 0 to numQpTables–1, inclusive, and j in the range of 0 to num_points_in_qp_table_minus1[i]+1, inclusive.
. . .

8.7.1 Derivation Process for Quantization Parameters

. . .

When the current slice is an I-slice, ChromaQpTable[ i ] is set equal to IntraChromaQpTable[ i ] for i = 0..2. When the current slices is a B or P slice, ChromaQpTable[ i ] is set equal to InterChromaQpTable[ i ] for i = 0..2.

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$qP_{Chroma}$=Clip3(-QpBdOffset,63,$Qp_Y$)   (1143)

$qP_{Cb}$=ChromaQpTable[0][$qP_{Chroma}$]   (1144)

$qP_{Cr}$=ChromaQpTable[1][$qP_{Chroma}$]   (1145)

$qP_{CbCr}$=ChromaQpTable[2][$qP_{Chroma}$]   (1146)

...

6.2. Embodiment 2: Number of Pivot Points and Clipping of Mapped Chroma QP

The changes, marked in *bold faced italics*, are based on JVET-Q2001-vC.

7.3.2.3 Sequence Parameter Set RBSP Syntax

| seq_parameter_set_rbsp( ) { | Descriptor |
|---|---|
| ...... | |
| if( ChromaArrayType != 0 ) { | |
|   sps_joint_cbcr_enabled_flag | u(1) |
|   same_qp_table_for_chroma | u(1) |
|   numQpTables = same_qp_table_for_chroma ? 1 : ( sps_joint_cbcr_enabled_flag ? 3 : 2 ) | |
|   for( i = 0; i < numQpTables; i++ ) { | |
|     [[qp_table_start_minus26[i ]]] | [[se(v)]] |
|     num_points_in_qp_table[[_minus1]][ i ] | ue(v) |
|     if( num_points_in_qp_table ) | |
|       *qp_table_start_minus26[ i ]* | *se(v)* |
|     for( j = 0; j <[[=]] num_joints_in_qp_table[[_minus1]][ i ]; j++ ) { | |
|       delta_qp_in_val_minus1[i ][j ] | ue(v) |
|       delta_qp_diff_val[ i ][ j ] | ue(v) |
|     } | |
|   } | |
| } | |
| ...... | | num_points_in_qp_table[[_minus1]][i][[plus 1]] specifies the number of points used to describe the i-th chroma QP mapping table. The value of num_points_in_qp_table[[_minus1]][i] shall be in the range of 0 to 63+QpBdOffset, inclusive. [[When numpoints_in_qp_table_minus1[0] is not present in the bitstream, the value of numpoints_in_qp_table_minus1[0] is inferred to be equal to 0.]]

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table.

The i-th chroma QP mapping table ChromaQpTable[i] for i=0 ... numQpTables−1 is derived as follows:

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

```
[[qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] + delta_qp_in_val_minus1[ i ][ j ] + 1
  qpOutVal[ i ][ j + 1 ] = qpOutVal[ i ][ j ] +
  ( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1 63; k >= −QpBdOffset; − − )
  ChromaQpTable[ i ][ k ] = Clip3( −QpBdOffset, 63, ChromaQpTable[ i ][ k + 1 ] − 1 )
for( j = 0; j <= num_points_in_qp_table_minus1[ i ]; j++ ) {
```

```
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ] [j + 1] − qpOutVal[ i ] [j ] ) * m + sh ) /
( delta_qp_in_val_minus1[ i ][j] + 1 )
}
for( k = qpInVal[ i ][ num_points_in_qp_table_minus1[ i ] + 1 ] + 1; k <= 63; k++ )
    ChromaQpTable[ i ][ k ] = Clip3( −QpBdOffset, 63, ChromaQpTable[ i ][ k − 1 ] + 1
)]]
for( k = 63; k >= -QpBdOffset; k - - )
    ChromaQpTable[ i ][ k ] = Clip3 ( -QpBdOffset,63, ChromaQpTable[ i ][ k + 1 ] - 1)
if( num_points_in_qp_table[ i ] > 0 ) {
    qpInVal[ i ][ 0 ] = qp_table_start_minus26[ i ] + 26
    qpOutVal[ i ][ 0 ] = qpInVal[ i ][ 0 ]
}
for( j = 0; j < num_points_in_qp_table[ i ]; j ++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
    ( delta_qp_in_val_minus1[ i ][ j ] ^ delta_qp_diff_val[ i ][ j ] )        sh =
    ( delta_qp_in_val_minus1[ i ][ j ] + 1 ) >> 1
    for( k = qpInVal[ i ][ j ] + 1, m = 1; k<= qpInval[ i ][ j + 1 ]; k++, m++ )
        ChromaQpTable[ i ][ k ] = Clip3( -QpBdOffset, 63,
ChromaQpTable[ i ][ qpInVal[ i ][ j ] ] +
    ( ( qpOutVal[ i ][ j + 1] - qpOutVal[ i ][ j ] ) * m + sh ) /
( delta_qp_in_val_minus1[ i ][ j ] + 1 ))
}
if( num_points_in_qp_table[ i ] > 0 )
    for( k = qpInVal[ i ][ num_points_in_qp_table[ i ] ] + 1; k <= 63; k++ )
        ChromaQpTable[ i ][ k ] = Clip3( -QpBdOffset,63, ChromaQpTable[ i ][ k - 1 ] +
1 )
```

It is a requirement of bitstream conformance that the values of qpInVal[i][j] [[and qpOutVal[i][j]]] shall be in the range of −QpBdOffset to 63, inclusive for i in the range of 0 to numQpTables−1, inclusive, and j in the range of 0 to numpoints_in_qp_table_minus1[i]+1, inclusive.

6.3. Embodiment 3

The changes, marked in _bold italicized underlined_ text, are based on JVET-Q2001-vE.
The i-th chroma QP mapping table ChromaQpTable[i] for i=0 . . . numQpTables−1 is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] + (( delta_qp_in_val_minus1[ i ][ j ]+1)
        ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] − 1; k >= −QpBdOffset; k − − )
    ChromaQpTable[ i ][ k ] = Clip3( −QpBdOffset, 63, ChromaQpTable[ i ][ k + 1 ] − 1 )
for( j = 0; j <= num_points_in_qp_table_minus1[ i ]; j++ ) {
    sh = ( delta_qp_in_val_minus1[ i ][j] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ][j + 1] − qpOutVal[ i ][j ] ) * m + sh ) /
( delta_qp_in_val_minus1[ i ][j] + 1 )
}
for( k = qpInVal[ i ][ num_points_in_qp_table_minus1[ i ] + 1 ] + 1; k <= 63; k++ )
    ChromaQpTable[ i ][ k ] = Clip3( −QpBdOffset, 63, ChromaQpTable[ i ][ k − 1 ] + 1 )
```

When same_qp_table_for_chroma is equal to 1, ChromaQpTable[1][k] and ChromaQpTable[2][k] are set equal to ChromaQpTable[0][k] for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive.

6.4. Embodiment 4

The newly added text is marked in _bold italicized underlined_ text and the deleted texts are marked in open and close double brackets (e.g., [[ ]]) indicating deleted text in between the double brackets. It is based on JVET-Q2001-vE.

7.3.2.3 Sequence Parameter Set RBSP Syntax

| seq_parameter_set_rbsp( ) { | Descriptor |
|---|---|
| ... | |
| if( ChromaArrayType != 0 ) { | |
|   _sps_one_set_of_chroma_qp_tables_flag_ | _u(1)_ |
|   sps_joint_cbcr_enabled_flag | u(1) |
|   same_qp_table_for_chroma_set0_ | u(1) |
|   numQpTables_Set0_ = same_qp_table_for_chroma_set0_ ? 1 : | |
|     ( sps_joint_cbcr_enabled_flag ? 3 : 2 ) | |
|   for( i = 0; i < numQpTables; i++ ) { | |
|     [[qp_table_start_minus26[i ]]] | [[se(v)]] |
|     num_points_in_qp_table[[_minus1]]_set0_ [ i ] | ue(v) |
|     _if( num_points_in_qp_table_set0[ i ] )_ | |
|       _qp_table_start_set0[ i ]_ | _ue(v)_ |
|     for( j = 0; j <[[=]] num_points_in_qp_table[[_minus1]]_set0[ i ]; j++ ) { | |
|       delta_qp_in_val_minus1_set0_ [ i ][ j ] | ue(v) |
|       delta_qp_diff_val_set0_ [ i ][ j ] | ue(v) |
|     } | |
|   } | |
| _if( !sps_one_set_of_chroma_qp_tables_flag ) {_ | |
|   _same_qp_table_for_chroma_set1_ | _u(1)_ |
|   _numQpTableSet1 = same_qp__table_for_chroma_set1 ? 1 :_ | |
|     _( sps_joint_cbcr_enabled_flag ? 3 : 2 )_ | |
|   _for( i = 0; i < numQpTablesSet1; i++ ) {_ | |
|     _num_points_in_qp_table_set1 [ i ]_ | _ue(v)_ |
|     _if (num_points_in_qp_table_set1[ i ] )_ | |
|       _qp_table_start_set1 [ i ]_ | _ue(v)_ |
|     _for( j = 0; j < num_points_in__qp_table_set1[ i ]; j++ ) {_ | |
|       _delta_qp_in_val minus1_set1 [ i ] [ j ]_ | _ue(v)_ |
|       _delta_qp_diff_val_set1 [ i ][ j ]_ | _ue(v)_ |
|     _}_ | |
|   _}_ | |
| _}_ | |
| } | |
| ... | |

7.4.3.3 Sequence Parameter Set RBSP Semantics

...

_sps_one_set_of_chroma_qp_tables_flag equal to 0 specifies that there are two sets of chroma QP mapping tables. sps_one_set_of_chroma_qp_tables_flag equal to 1 specifies that there are just one set of chroma QP mapping tables._ same_qp_table_for_chroma _set0_ equal to 1 specifies that only one chroma QP mapping table is signalled and this table applies to Cb and Cr residuals and additionally to joint Cb-Cr residuals when sps_joint_cbcr_enabled_flag is equal to 1 _for the 1st set of chroma QP mapping tables._ same_qp_table_for_chroma _set0_ equal to 0 specifies that chroma QP mapping tables, two for Cb and Cr, and one additional for joint Cb-Cr when sps_joint_cbcr_enabled_flag is equal to 1, _for the 1st set of chroma QP mapping tables,_ are signalled in the SPS. When same_qp_table_for_chroma _set0_ is not present in the bitstream, the value of same_qp_table_for_chroma _set0_ is inferred to be equal to 1.

num_points_in_qp_table_minus1 _set0_ [i] plus 1 specifies the number of points used to describe the i-th chroma QP mapping table _for the 1st set of chroma QP mapping tables_. The value of num_points_in_qp_table_minus1 _set0_ [i] shall be in the range of 0 to 63+QpBdOffset, inclusive. When num_points_in_qp_table_minus1 _set0_ [0] is not present in the bitstream, the value of num_points_in_qp_table_minus1 _set0_ [0] is inferred to be equal to 0.

qp_table_start[[_minus26]] _set0_ [i][[plus 26]] specifies the starting luma and chroma QP used to describe the i-th chroma QP mapping table _for the 1st set of chroma QP mapping tables_. The value of qp_table_start[[_minus26]] _set0_ [i] shall be in the range of [[−26]]−QpBdOffset to [[36]] _62_ inclusive. When qp_table_start[[_minus26]] _set0_ [i] is not present in the bitstream, the value of qp_table_start[[_minus26]] _set0_ [i] is inferred to be equal to 0.

delta_qp_in_val_minus1 _set0_ [i][j] specifies a delta value used to derive the input coordinate of the j-th pivot point of the i-th chroma QP mapping table _for the 1st set of chroma QP mapping tables._ . When delta_qp_in_val_minus1 _set0_ [0][j] is not present in the bitstream, the value of delta_qp_in_val_minus1 _set0_ [0][j] is inferred to be equal to 0.

delta_qp_diff_val_set0_ [i][j] specifies a delta value used to derive the output coordinate of the j-th pivot point of the i-th chroma QP mapping table _for the 1st set of chroma QP mapping tables._

_same_qp_table_for_chroma_set1 equal to 1 specifies tht only one chroma QP mapping table is signalled and this table applies to Cb and Cr residuals and additionally to joint Cb-Cr residuals when sps_joint_cbcr_enabled_flag_

*is equal to 1 for the 2$^{nd}$ set of chroma QP mapping tables. same_qp_table_for_chroma_set1 equal to 0 specifies that chroma QP mapping tables, two for Cb and Cr, and one additional for joint Cb-Cr when sps_joint_cbcr_enabled_flag is equal to 1, for the 2$^{nd}$ set of chroma QP mapping tables, are signalled in the SPS. When*

*Let ChromaQpTable[ i ] denotes the Chroma QpTableSetX[ i ], qp_table_start[ i ] denotes the qp_table_start_setX[ i ], delta_qp_in_val_minus1[ i ] denotes delta_qp_in_val_minus1_setX[ i ], delta_qp_diff_val[ i ] denotes delta_qp_diff_val_setX[ i ] for X being 0 and 1 respectively, the following applies:*

```
qpInVal[ i ][ 0 ] = qp_table_start[[_minus26]][ i ] [[+ 26]]
qpOutVal[ i ][ 0 ] = qpInVal[ i ][ 0 ]
for( j = 0; j <[[=]] num_points_in_qp_table[[_minus1]][ i ]; j++ ) {
    qpInVal[ i ][ j + 1 ] = qpInVal[ i ][ j ] + delta_qp_in_val_minus1[ i ][ j ] + 1
    qpOutVal[ i ][ j + 1 ] = qpOutVal[ i ][ j ] +
( delta_qp_in_val_minus1[ i ][ j ] ^ delta_qp_diff_val[ i ][ j ] )
}
ChromaQpTable[ i ][ qpInVal[ i ][ 0 ] ] = qpOutVal[ i ][ 0 ]
for( k = qpInVal[ i ][ 0 ] - 1; k >= -QpBdOffset; k - - )
    ChromaQpTable[ i ][ k ] = Clip3( -QpBdOffset, 63, ChromaQpTable[ i ][ k + 1 ] - 1 )
                                                                                  (62)
for( j = 0; j <[[=]] num_points_in_qp_table[[_minus1]][ i ]; j++ ) {
    sh = ( delta_qp_in_val_minus1[ i ][j ] + 1 ) >> 1
    for( k = qpInVal[ i ][ j ] + 1, m = 1; k <= qpInval[ i ][ j + 1 ]; k++, m++ )
        ChromaQpTable[ i ][ k ] = ChromaQpTable[ i ][ qpInVal[ i ][ j ] ] +
            ( ( qpOutVal[ i ][j + 1] - qpOutVal[ i ][j ] ) * m + sh ) /
( delta_qp_in_val_minus1[ i ][j] + 1 )
}
```

*same_qp_table_for_chroma_set1 is not present in the bitstream, the value of same_qp_table_for_chroma_set1 is inferred to be equal to 1.*
*num_points_in_qp_table_minus1_set1[ i ] plus q specifies the number of points used to describe the i-th chroma QP mapping table for the 2$^{nd}$ set of chroma QP mapping tables. The valueof num_points_in_qp_table_minus1_set[ i ] shall*

*inclusive. When num_points_in_qp_table_minus1_set1[ 0 ] is not present in the bitstream, value of num_points_in_qp_table_minus1 set1[0] is inferred to be equal to 0.*
*qp_table_start_set1[ i ] specifies the starting luma and chroma QP used to describe the i-th chroma QP mapping table for the 2$^{nd}$ set of chroma QP mapping tables. The value of qp_table_start_set1[i] shall be in the range of - QpBdOffset to 62 inclusive. When qp_table_start_set1[i] is not present in the bitstream, the value of qp_table_start_set1[ i ] is inferred to be equal to 0.*
*delta_qp_in_minus1_set1[i][j] specifies a delta value used to derive the input coordinate of the j-th pivot point of the i-th chroma QP mapping table for the 2$^{nd}$ set of chroma QP mapping tables. When delta_qp_in_val_minus1_set1[0 ][j] is not present in the bitstream, the value of delta_qp_in_val_minus1_set1[ 0 ][ j] is inferred to be equal to 0.*
*delta_qp_diff_val_set1[ i ][ j ] specifies a delta value used to derive the output coordinate of the j-th pivot point of the i-th chroma QP mapping table for the 2$^{nd}$ set of chroma QP mapping tables.*
*The i-th chroma QP mapping table Chroma QpTableSet0[ i ] for i = 0..numQpTablesSet0 - 1 and the i-th chroma QP mapping table Chroma QpTableSet1[ i ] for i = 0..numQpTablesSet1 - 1 are derived as follows:*

*if( num_points_in_qp_table[ i ] == 0 )*
   *for( k = qpInVal[ i ][ 0 ] + 1; k<= 63; k ++ )*
      *ChromaQpTable[ i ][ k ] = Clip3( - QpBdOffset, 63, ChromaQpTable[ i ][ k - 1 ] + 1 )*
*else* for(k=qpInVal[i][num_points_in_qp_table[[minus1]] [i][[+1]]]+1;k<=63;k++)

ChromaQpTable[i][k]=Clip3(-QpBdOffset,63,ChromaQpTable[i][k-1]+1)

When same_qp_table_for_chroma $X$ is equal to 1, ChromaQpTable $X$ [1][k] and ChromaQpTable $X$ [2][k] are set equal to ChromaQpTable $X$ [0][k] *for X being 0 and 1 and* for k in the range of −QpBdOffset to 63, inclusive.

It is a requirement of bitstream conformance that the values of qpInVal[i][j] and qpOutVal[i][j] shall be in the range of −QpBdOffset to 63, inclusive for i in the range of 0 to numQpTables−1, inclusive, and j in the range of 0 to num_points_in_qp_table_minus1[i]+1, inclusive.

. . .

8.7.1 Derivation Process for Quantization Parameters

. . .

*When the current slice is an I slice, ChromaQp Table[ i ] is set equal to ChromaQpTableSet0[ i ] for i = 0..2. When the current slices is a B or P slice, ChromaQpTable[ i ] is set equal to ChromaQpTableSet1[ i ] for i = 0..2 when sps _one_set_of_chroma_qp_tables_flag is equal to 0, otherwise (when sps_one_set_of_chroma_qp_tables_flag is equal to 1), ChromaQpTable[ i ] is set equal to ChromaQpTableSet0[ i ] for i = 0..2.*

When ChromaArrayType is not equal to 0 and treeType is equal to SINGLE_TREE or DUAL_TREE_CHROMA, the following applies:

When treeType is equal to DUAL_TREE_CHROMA, the variable Qp$_Y$ is set equal to the luma quantization parameter Qp$_Y$ of the luma coding unit that covers the luma location (xCb+cbWidth/2, yCb+cbHeight/2).

The variables qP$_{Cb}$, qP$_{Cr}$ and qP$_{CbCr}$ are derived as follows:

$$qP_{Chroma} = Clip3(-QpBdOffset, 63, Qp_Y) \quad (1143)$$

$$qP_{Cb} = ChromaQpTable[0][qP_{Chroma}] \quad (1144)$$

$$qP_{Cr} = ChromaQpTable[1][qP_{Chroma}] \quad (1145)$$

$$qP_{CbCr} = ChromaQpTable[2][qP_{Chroma}] \quad (1146)$$

...

6.5. Embodiment 5

The newly added text is marked in *bold italicized underlined* and the deleted texts are marked in open and close double brackets (e.g., [[ ]]) indicating deleted text in between the double brackets. It is based on JVET-Q2001-vE.

7.3.2.3 Sequence Parameter Set RBSP Syntax

| seq_parameter_set_rbsp( ) { | Descriptor |
|---|---|
| ... | |
| if( ChromaArrayType != 0 ) { | |
| *sps_one_set_of_chroma_qp_tables_flag* | *u(1)* |
| sps_joint_cbcr_enabled_flag | u(1) |
| *numTables = sps_one_set_of_chroma_qp_tables_flag ? 1 : 2* | |
| *for( l = 0; l <= numTables; l++) {* | |
| *same_qp_table_for_chroma[ l ]* | u(1) |
| numQpTables***[ l ]*** = same_qp_table_for_chroma***[ l ]*** ? 1 : ( sps_joint_cbcr_enabled_flag ? 3 : 2 ) | |
| for( i = 0; i < numQpTables***[ l ]***; i++ ) { | |
| **qp_table_start_minus26*[ l ]*[ i ]** | se(v) |
| **num_points_in_qp_table_minus1*[ l ]*[ i ]** | ue(v) |
| for( j = 0; j <= num_points_in_qp_table_minus1***[ l ]***[ i ]; j++ ) { | |
| **delta_qp_in_val_minus1*[ l ]*[ i ][ j ]** | ue(v) |
| **delta_qp_diff_val*[ l ]*[ i ][ j ]** | ue(v) |
| } | |
| *}* | |
| } | |
| } | |
| ... | |

7.4.3.3 Sequence Parameter Set RBSP Semantics

...

*sps_one_set_of_chroma_qp_tables_flag equal to 0 specifies that there are two sets of chroma QP mapping tables. sps_one_set_of_chroma_qp_tables_flag equal to 1 specifies that there are just one set of chroma QP mapping tables. When not present, the value of sps_one_set_of_chroma_qp_tables_flag is inferred to be equal to 1.* same_qp_table_for_chroma*[ l ]* equal to 1 specifies that only one chroma QP mapping table is signalled and this table applies to Cb and Cr residuals and additionally to joint Cb-Cr residuals when sps_joint_cbcr_enabled_flag is equal to 1 *for the l-th set of chroma QP mapping tables*. same_qp_table_for_chroma*[ l ]* equal to 0 specifies that chroma QP mapping tables, two for Cb and Cr, and one additional for joint Cb-Cr when sps_joint_cbcr_enabled_flag is equal to 1, *for the l-th set of chroma QP mapping tables*, are signalled in the SPS. When same_qp_table_for_chroma*[ l ]* is not present in the bitstream, the value of same_qp_table_for_chroma*[ l ]* is inferred to be equal to 1.

qp_table_start_minus26*[ l ]* [i] plus 26 specifies the starting luma and chroma QP used to describe the i-th chroma QP mapping table *for the l-th set of chroma QP mapping tables*. The value of qp_table_start_minus26*[ l ]* [i] shall be in the range of −26−QpBdOffset to 36 inclusive. When qp_table_start_minus26*[ l ]* [i] is not present in the bitstream, the value of qp_table_start_minus26*[ l ]* [i] is inferred to be equal to 0.

num_points_in_qp_table_minus1*[ l ]* [i] plus 1 specifies the number of points used to describe the i-th chroma QP mapping table *for the l-th set of chroma QP mapping tables*. The value of num_points_in_qp_table_minus1*[ l ]* [i] shall be in the range of 0 to 63+QpBdOffset, inclusive. When num_points_in_qp_table_minus1*[ l ]* [0] is not present in the bitstream, the value of num_points_in_qp_table_minus1*[ l ]* [0] is inferred to be equal to 0.

delta_qp_in_val_minus1*[ l ]* [j] specifies a delta value used to derive the input coordinate of the j-th pivot point of the i-th chroma QP mapping table *for the l-th set of chroma QP mapping tables*. When delta_qp_in_val_minus1*[ l ]* [0][j] is not present in the bitstream, the value of delta_qp_in_val_minus1*[ l ]* [0][j] is inferred to be equal to 0.

delta_qp_diff_val*[ l ]* [i][j] specifies a delta value used to derive the output coordinate of the j-th pivot point of the i-th chroma QP mapping table *for the l-th set of chroma QP mapping tables.*

*The l-th chroma QP mapping table ChromaQpTable[ l ][ i ] for l = 0.. sps_one_set_of_chroma_qp_tables_flag ? 1 : 2 and i = 0..numQpTables[ l ] − 1 are derived as follows:* qpInVal*[ l ]*[ i ][ 0 ] = qp_table_start_minus26*[ l ]*[ i ] + 26
qpOutVal*[ l ]*[ i ][ 0 ] = qpInVal*[ l ]*[ i ][ 0 ]
for( j = 0; j <= num_points_in_qp_table_minus1*[ l ]*[ i ]; j++ ){

-continued

```
  qpInVal[[ i ][ j + 1 ] = qpInVal[[ i ][ j ] + delta_qp_in_val_minus1[[ i ][ j ] + 1
  qpOutVal[[ i ][ j + 1 ] = qpOutVal[[ i ][ j ] +
    ( delta_qp_in_val_minus1[[ i ][ j ] ^ delta_qp_diff_val[[ i ][ j ])
}
ChromaQpTable[[ i ][ qpInVal[[ i ][ 0 ] ] = qpOutVal[[ i ][ 0 ]
for( k = gpInVal[[ i ][ 0 ] - 1; k >= -QpBdOffset; k - - )
  ChromaQpTable[[ i ][ k ] = Clip3( -QpBdOffset, 63,
ChromaQpTable[[ i ][ k + 1 ] - 1 )                                         (62)
for( j = 0; j <= num_points_in_qp_table_minus1[[ i ]; j++ ) {
  sh = ( delta_qp_in_val_minus1[[ i ] [j] + 1 ) >> 1
  for( k = qpInVal[[ i ][ j ] + 1, m = 1; k <= qpInval[[ i ][ j + 1 ]; k++, m++ )
    ChromaQpTable[[ i ][ k ] = ChromaQpTable[[ i ][ qpInVal[[ i ][ j ] ] +
    ( ( qpOutVal[[ i ][ j + 1 ] - qpOutVal[[ i ][j] ) * m + sh ) /
    ( delta_qp_in_val_minus1[[ i ] [j] + 1 )
}
for( k = gpInVal[[ i ][ num_points_in_qp_table_minus1[[ i ] + 1 ] + 1; k <= 63; k++
)
  ChromaQpTable[[ i ][ k ] = Clip3( -QpBdOffset, 63, ChromaQpTable[[ i ][ k - 1 ]
+
1)
```

When same_qp_table_for_chroma[ 1 ] is equal to 1, ChromaQpTable[ 1 ][1][k] and ChromaQpTable[1][ [2][k] are set equal to ChromaQpTable[1][0][k] for k in the range of −QpBdOffset to 63, inclusive.

It is a requirement of bitstream conformance that the values of qpInVal[ 1 ][i][j] and qpOutVal[1][i][j] shall be in the range of −QpBdOffset to 63, inclusive for i in the range of 0 to numQpTables[ 1 ] −1, inclusive, and j in the range of 0 to num_points_in_qp_table_minus1[1][i]+1, inclusive.

. . .

8.7.1 Derivation Process for Quantization Parameters

. . .

*When the current slice is an I slice, chromaQp Table[ i ] is set equal to ChromaQpTable[ 0 ][ i ] for i = 0..2. When the current slices is a B or P slice, chromaQpTable[ i ] is set equal to ChromaQpTable[ 1 ][ i ] for i = 0..2 when sps_ one_set_of_chroma_qp_tables_flag is equal to 0, otherwise (when sps_one_set_of_chroma_qp_ tables_flag is equal to 1), chromaQpTable[ i ] is set equal to ChromaQpTable[ 0 ][ i ] for i = 0..2.*

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables $qP_{Cb}$, $qP_{Cr}$ and $qP_{CbCr}$ are derived as follows:

$$qP_{Chroma} = \text{Clip3}(-QpBdOffset, 63, Qp_Y) \quad (1143)$$

$$qP_{Cb} = [[C]]\underline{c}hromaQpTable[0][qP_{Chroma}] \quad (1144)$$

$$qP_{Cr} = [[C]]\underline{c}hromaQpTable[1][qP_{Chroma}] \quad (1145)$$

$$qP_{CbCr} = [[C]]\underline{c}hromaQpTable[2][qP_{Chroma}] \quad (1146)$$

6.6. Embodiment 6

The suggested specification changes on top of NET-Q2001-vE is described as follows. Deleted texts are marked in open and close double brackets (e.g., [[ ]]) indicating deleted text in between the double brackets, and newly added text is highlighted in *bold italicized underlined* text.

7.3.10.2 Coding Tree Unit Syntax

| coding_tree_unit( ) { | Descriptor |
|---|---|
| xCtb = CtbAddrX << CtbLog2SizeY | |
| yCtb = CtbAddrY << CtbLog2SizeY | |
| if( slice_sao_luma_flag \| \| slice_sao_chroma_flag ) | |
|   sao( CtbAddrX, CtbAddrY ) | |
| if( slice_alf_enabled_flag ){ | |
|   alf_ctb_flag[ 0 ][ CtbAddrX ][ CtbAddrY ] | ae(v) |
|   if( alf_ctb_flag[ 0 ][ CtbAddrX ][ CtbAddrY ] ) { | |
|     if( slice_num_alf_aps_ids_luma > 0 ) | |
|       alf_use_aps_flag | ae(v) |
|     if( alf_use_aps_flag ) { | |
|       if( slice_num_alf_aps_ids_luma > 1 ) | |
|         alf_luma_prev_filter_idx | ae(v) |
|     } else | |
|       alf_luma_fixed_filter_idx | ae(v) |
| [[}]] | |
|     if( slice_alf_chroma_idc = = 1 \| \| slice_alf_chroma_idc = = 3 ) { | |
|       alf_ctb_flag[ 1 ][ CtbAddrX ][ CtbAddrY ] | ae(v) |
|       if( alf_ctb_flag[ 1 ][ CtbAddrX ][ CtbAddrY ] | |
|         && alf_chroma_num_alt_filters_minus1 > 0 ) | |

```
coding_tree_unit( ) {                                                    Descriptor
        alf_ctb_filter_alt_idx[ 0 ][ CtbAddrX ][ CtbAddrY ]              ae(v)
      }
      if( slice_alf_chroma_idc = = 2 | | slice_alf_chroma_idc = = 3 ) {
        alf_ctb_flag[ 2 ][ CtbAddrX ][ CtbAddrY ]                        ae(v)
        if( alf_ctb_flag[ 2 ][ CtbAddrX ][ CtbAddrY ]
            && alf_chroma_num_alt_filters_minus1 > 0 )
          alf_ctb_filter_alt_idx[ 1 ][ CtbAddrX ][ CtbAddrY ]            ae(v)
      }
[[}]]
      if( slice_cc_alf_cb_enabled_flag )
        alf_ctb_cc_cb_idc[ CtbAddrX ][ CtbAddrY ]                        ae(v)
      if( slice_cc_alf_cr_enabled_flag )
        alf_ctb_cc_cr_idc[ CtbAddrX ][ CtbAddrY ]                        ae(v)
    }
  }
  if( slice_type = = I && qtbtt_dual_tree_intra_flag )
    dual_tree_implicit_qt_split( xCtb, yCtb, CtbSizeY, 0 )
  else
    coding_tree( xCtb, yCtb, CtbSizeY, CtbSizeY, 1, 1, 0, 0, 0, 0, 0,
        SINGLE_TREE, MODE_TYPE_ALL )
}
```

6.7. Seventh Set of Embodiments

This is a set of embodiments for items 20 summarized above in Section 5.

The changed texts are based on the latest VVC text in JVET-Q2001-vE. Most relevant parts that have been added or modified are highlighted in _bold italicized underlined_ text, and some of the deleted texts are marked in open and close double brackets (e.g., [[ ]]) indicating deleted text in between the double brackets.

6.7.1. An Example Embodiment

In one example, the SPS syntax structure may be changed as follows:

| seq_parameter_set_rbsp( ) { | Descriptor |
|---|---|
| ... | u(4) |
| sps_transform_skip_enabled_flag | u(1) |
| if( sps_transform_skip_enabled_flag ) { | |
| _sps_ts_residual_coding_enabled_flag_ | _u(1)_ |
| log2_transform_skip_max_size_minus2 | ue(v) |
| sps_bdpcm_enabled_flag | u(1) |
| } | |
| ... | |

_sps_ts_residual_coding_enabled_flag equal to 1 specifies that slice_ts_residual_coding_disabled_flag may be present in the CLVS. sps_ts_residual_coding_enabled_flag equal to 0 specifies that slice_ts_residual_coding_disabled_flag is not present in the CLVS. When not present, the value of sps_ts_residual_coding_enabled_flag is inferred to be equal to 0._

In one example, the PPS syntax structure may be changed as follows:

| pic_parameter_set_rbsp( ) { | Descriptor |
|---|---|
| ... | |
| cabac_init_present_flag | u(1) |
| _pps_ts_residual_coding_enabled_flag_ | _u(1)_ |

-continued

| pic_parameter_set_rbsp( ) { | Descriptor |
|---|---|
| _if( pps_ts_residual_coding_enabled_flag )_ | |
| _ts_residual_coding_flag_in_ph_ | _u(1)_ |

_pps_ts_residual_coding_enabled_flag equal to 1 specifies that ph/slice_ts_residual_coding_enabled_flag may be present in pictures/slices referring to the PPS. pps_ts_residual_coding_enabled_flag equal to 0 specifies that ph/slice_ts_residual_coding_enabled_flag is not present in the pictures/slices referring to the PPS._

_It is required that, when sps_ts_residual_coding_enabled_flag is equal to 0, the value of pps_ts_residual_coding_enabled_flag shall be equal to 0._

_It is required that, when sps_transform_skip_enabled_flag is equal to 0, the value of pps_ts_residual_coding_enabled_flag shall be equal to 0._

_ts_residual_coding_flag_in_ph equal to 1 specifies that ph_ts_residual_coding_disabled_flag may be present in the PH. pps_ts_residual_coding_enabled_flag equal to 0 specifies that slice_ts_residual_coding_disabled_flag may be present in the SH._

In one example, the PH syntax structure may be changed as follows:

| picture_header_structure( ) { | Descriptor |
|---|---|
| ... | |
| if( output_flag_present_flag ) | |
| pic_output_flag | u(1) |
| _if( pps_ts_residual_coding_enabled_flag &&_ | |
| _ts_residual_coding_flag_in_ph )_ | |
| _ph_ts_residual_coding_enabled_flag_ | _u(1)_ |
| ... | |

*ph_ts_residual_coding_enabled_flag equal to 0 specifies that the residual_coding( ) syntax structure is used to parse the residual samples of a transform skip block for all slices of the current picture. ph_ts_residual_coding_ enabled_flag equal to 1 specifies that the residual_ts_coding( ) syntax structure may be used to parse the residual samples of a transform skip block for all slices of the current picture. When*
residual_coding_[[disabled]]*enabled* flag equal to [[0]]*1* specifies that the residual_ts_coding( ) syntax structure is used to parse the residual samples of a transform skip block for the current slice. When slice_ts_residual_coding_[[disabled]]*enabled* flag is not present, it is infered to be equal to [[0]] *ph_ts_residual_coding_enabled_flag*.

In one example, the transform_unit( ) syntax structure may be changed as follows:

| transform_unit( x0, y0, tbWidth, tbHeight, treeType, subTuIndex, chType ) { | Descriptor |
|---|---|
| ... | |
|   if( tu_y_coded_flag[ x0 ][ y0 ] && treeType != DUAL_TREE_CHROMA ) { | |
|     if( sps_transform_skip_enabled_flag && !BdpcmFlag[ x0 ][ y0 ][ 0 ] && | |
|       tbWidth <= MaxTsSize && tbHeight <= MaxTsSize && | |
|       ( IntraSubPartitionsSplitType == ISP_NO_SPLIT) && !cu_sbt_flag ) | |
|       transform_skip_flag[ x0 ][ y0 ][ 0 ] | ae(v) |
|     *if( slice_ts_residual_coding_enabled_flag &&* | |
| *transform_skip_flag[ x0 ][ y0 ][ 0 ] )* | |
|       *tu_ts_residual_coding_flag[ x0 ][ y0 ][ 0 ]* | *ae(v)* |
|     if( !transform_skip_flag[ x0 ][ y0 ][ 0 ] | |
|      || *!tu_ts_residual_coding_flag[ x0 ][ y0 ][ 0 ]* [[slice_ts_residual_coding_ disabled_flag]] ) | |
|       residual_coding( x0, y0, Log2( tbWidth ), Log2( tbHeight ), 0 ) | |
|     else | |
|       residual_ts_coding( x0, y0, Log2( tbWidth ), Log2( tbHeight ), 0 ) | |
|   } | |
|   if( tu_cb_coded_flag[ xC ][ yC ] && treeType != DUAL_TREE_LUMA ) { | |
|     if( sps_transform_skip_enabled_flag && !BdpcmFlag[ x0 ][ y0 ][ 1 ] && | |
|       wC <= MaxTsSize && hC <= MaxTsSize && !cu_sbt_flag ) | |
|       transform_skip_flag[ xC ][ yC ][ 1 ] | ae(v) |
|     *if( slice_ts_residual_coding_enabled_flag &&* | |
| *transform_skip_flag[ xC ][ yC ][ 1 ] )* | |
|       *tu_ts_residual_coding_flag[ xC ][ yC ][ 1 ]* | *ae(v)* |
|     if( !transform_skip_flag[ xC ][ yC ][ 1 ] | |
|      || *!tu_ts_residual_coding_flag[ xC ][ yC ][ 1 ]* [[slice_ts_residual_coding_disabled_flag]]) | |
|       residual_coding( xC, yC, Log2( wC ), Log2( hC ), 1 ) | |
|     else | |
|       residual_ts_coding( xC, yC, Log2( wC ), Log2( hC ), 1 ) | |
|   } | |
|   if( tu_cr_coded_flag[ xC ][ yC ] && treeType != DUAL_TREE_LUMA && | |
|     !(tu_cb_coded_flag[ xC ][ yC ] && | |
| tu_joint_cbcr_residual_flag[ xC ][ yC ] ) ) { | |
|     if( sps_transform_skip_enabled_flag && !BdpcmFlag[ x0 ][ y0 ][ 2 ] && | |
|       wC <= MaxTsSize && hC <= MaxTsSize && !cu_sbt_flag ) | |
|       transform_skip_flag[ xC ][ yC ][ 2 ] | ae(v) |
|     *if(slice_ts_residual_coding_enabled_flag &&* | |
| *transform_skip_flag[ xC ][ yC ][ 2 ] )* | |
|       *tu_ts_residual_coding_flag[ xC ][ yC ][ 2 ]* | *ae(v)* |
|     if( !transform_skip_flag[ xC ][ yC ][ 2 ] | |
|      || *!tu_ts_residual_coding_flag[ xC ][ yC ][ 2 ]*[[slice_ts_residual_coding_disabled_flag]] ) | |
|       residual_coding( xC, yC, Log2( wC ), Log2( hC ), 2 ) | |
|     else | |
|       residual_ts_coding( xC, yC, Log2( wC ), Log2( hC ), 2 ) | |
|   } | |
| } | |

*ph_ts_residual_coding_enabled_flag is not present, it is infered to be equal to 0.*

In one example, the PH syntax structure may be changed as follows:

| slice_header( ) { | Descriptor |
|---|---|
| ... | |
|   *if( pps_ts_residual_coding_enabled_flag &&* | |
| *!ts_residual_coding_flag_in_ph )* | |
|     slice_ts_residual_coding_[[disabled]]*enabled_* flag | u(1) | slice_ts_residual_coding_[[disabled]]*enabled_* flag equal to [[1]]*0* specifies that the residual_coding( ) syntax structure is used to parse the residual samples of a transform skip block for the current slice. slice_ts_

*tu_ts_residual_coding_flag[ x0 ] [ y0 ] [ cIdx ] equal to 1 specifies that for the current coding unit, when slice_ts_residual_coding_enabled_ flag and transform_skip_flag[ x0 ][ y0][ cIdx ] are equal to 1, then transform skip residual coding is used.*

*tu_ts_residual_coding_flag[ x0 ][ y0 ][ cIdx ] equal to 0 specifies that for the current coding unit, when slice_ts_residual_coding_enabled_ flag and transform_skip_flag[ x0 ][ y0][ cIdx ] are equal to 1, the transform residual coding is used. When tu_ts_residual_coding_flag[ x0 ][ y0 ][ cIdx ] is not signaled, it is inferred to be equal to 0.*

6.7.2. Another Example Embodiment

Alternatively, the PPS, PH, SH syntax may be changed as follows:

| pic_parameter_set_rbsp( ) { | Descriptor |
|---|---|
| ... | |
| cabac_init_present_flag | u(1) |
| *pps_ts_residual_coding_enabled_flag* | *u(1)* |

*pps_ts_residual_coding_enabled_flag equal to 1 specifies that ph/slice_ts_residual_coding_enabled_flag may be present in pictures/slices referring to the PPS. pps_ts_residual_coding_enabled_flag equal to 0 specifies that ph/slice_ts_residual_coding_enabled_flag is not present in the pictures/slices referring to the PPS.*
*It is required that, when sps_ts_residual_coding_enabled_flag is equal to 0, the value of pps_ts_residual_coding_enabled_flag shall be equal to 0.*
*It is required that, when sps_transform_skip_enabled_flag is equal to 0, the value of pps_ts_residual_coding_enabled_flag shall be equal to 0.*

| picture_header_structure( ) { | Descriptor |
|---|---|
| ... | |
| if( output_flag_present_flag ) | |
| pic_output_flag | u(1) |
| *if( pps_ts_residual_coding_enabled_flag )* | |
| *ph_ts_residual_coding_enabled_flag* | *u(1)* |
| ... | |

*ph_ts_residual_coding_enabled_flag equal to 0 specifies that the residual_coding( ) syntax structure is used to parse the residual samples of a transform skip block for all slices of the current picture. ph_ts_residual_coding_enabled_flag equal to 1 specifies that the residual_ts_coding( ) syntax structure may be used to parse the residual samples of a transform skip block for all slices of the current picture. When ph_ts_residual_coding_enabled_flag is not present, it is infered to be equal to 0.*

| slice_header( ) { | Descriptor |
|---|---|
| ... | |
| *if( ph_ts_residual_coding_enabled_flag )* | |
| slice_ts_residual_coding_[[disabled]]*enabled* flag | u(1) | slice_ts_residual_coding_[[disabled]]*enabled* flag equal to [[1]]*0* specifies that the residual_coding( ) syntax structure is used to parse the residual samples of a transform skip block for the current slice. slice_ts_residual_coding_[[disabled]]*enabled* flag equal to [[0]]*1* specifies that the residual_ts_coding( ) syntax structure is used to parse the residual samples of a transform skip block for the current slice. When slice_ts_residual_coding_[[disabled]]*enabled* flag is not present, it is inferred to be equal to 0.

6.7.3. Another Example Embodiment

Alternatively, the PPS, SH syntax may be changed as follows:

| pic_parameter_set_rbsp( ) { | Descriptor |
|---|---|
| ... | |
| cabac_init_present_flag | u(1) |
| *pps_ts_residual_coding_enabled_flag* | *u(1)* |

*pps_ts_residual_coding_enabled_flag equal to 1 specifies that ph/slice_ts_residual_coding_enabled_flag may be present in pictures/slices referring to the PPS. pps_ts_residual_coding_enables_flag equal to 0 specifies that ph/slice_ts_residual_coding_enabled_flag is not present in the pictures/slices referring to the PPS.*
*It is required that, when sps_ts_residual_coding_enabled_flalg is equal to 0, the value of pps_ts_residual_coding_enabled_flag shall be equal to 0.*
*It is required that, when sps_transform_skip_enabled_flag is equal to 0, the value of pps_ts_residual_coding_enabled_flag shall be equal to 0.*

| slice_header( ) { | Descriptor |
|---|---|
| ... | |
| *if( pps_ts_residual_coding_enabled_flag )* | |
| slice_ts_residual_coding_[[disabled]]*enabled* flag | u(1) | slice_ts_residual_coding_[[disabled]]*enabled* flag equal to [[1]]*0* specifies that the residual_coding( ) syntax structure is used to parse the residual samples of a transform skip block for the current slice. slice_ts_residual_coding_[[disabled]]*enabled* flag equal to [[0]] *1* specifies that the residual_ts_coding( ) syntax structure is used to parse the residual samples of a transform skip block for the current slice. When slice_ts_residual_coding_[[disabled]]*enabled* flag is not present, it is infered to be equal to 0.

6.7.4. Another Example Embodiment

Alternatively, the SH syntax may be changed as follows:

| slice_header( ) { | Descriptor |
|---|---|
| ... | |
| *if(sps_transform_skip_enabled_flag )* | |
| slice_ts_residual_coding_[[disabled]]*enabled* flag | u(1) | slice_ts_residual_coding[[disabled]]*enabled* flag equal to [[1]]*0* specifies that the residual_coding( ) syntax structure is used to parse the residual samples of a transform skip block for the current slice. slice_ts_residual_coding_[[disabled]]*enabled* flag equal to [[0]]1 specifies that the residual_ts_coding( ) syntax structure is used to parse the residual samples of a transform skip block for the current slice. When slice_ts_residual_coding_[[disabled]]*enabled* flag is not present, it is infered to be equal to 0.

Figure 3:
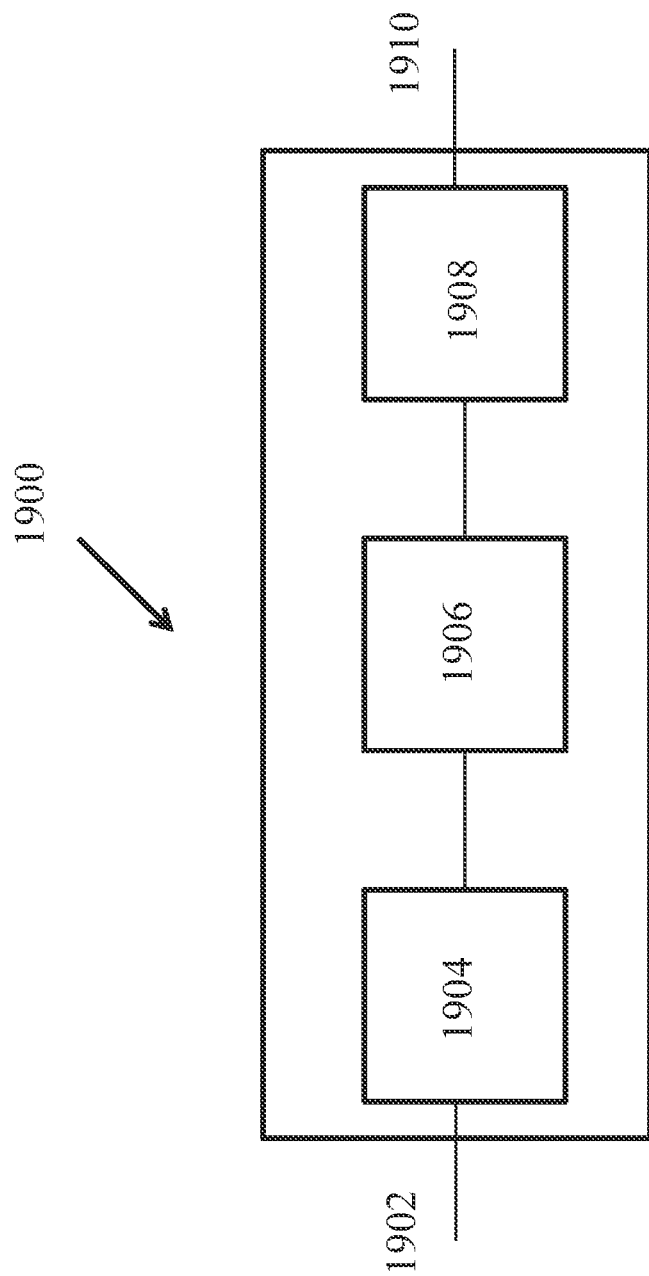
FIG. 3 is a block diagram of an example video processing system.

FIG. 3 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multicomponent pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 4:
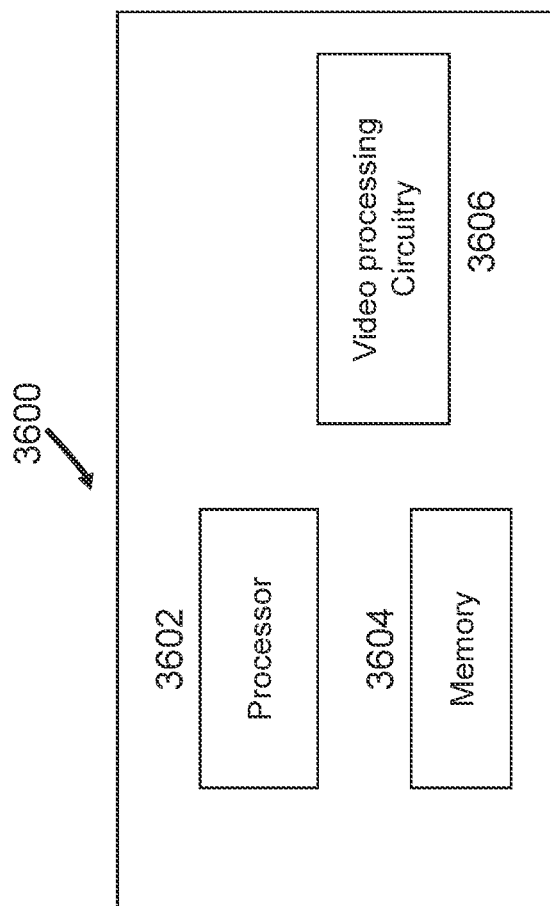
FIG. 4 is a block diagram of a video processing apparatus.
Figure 5:
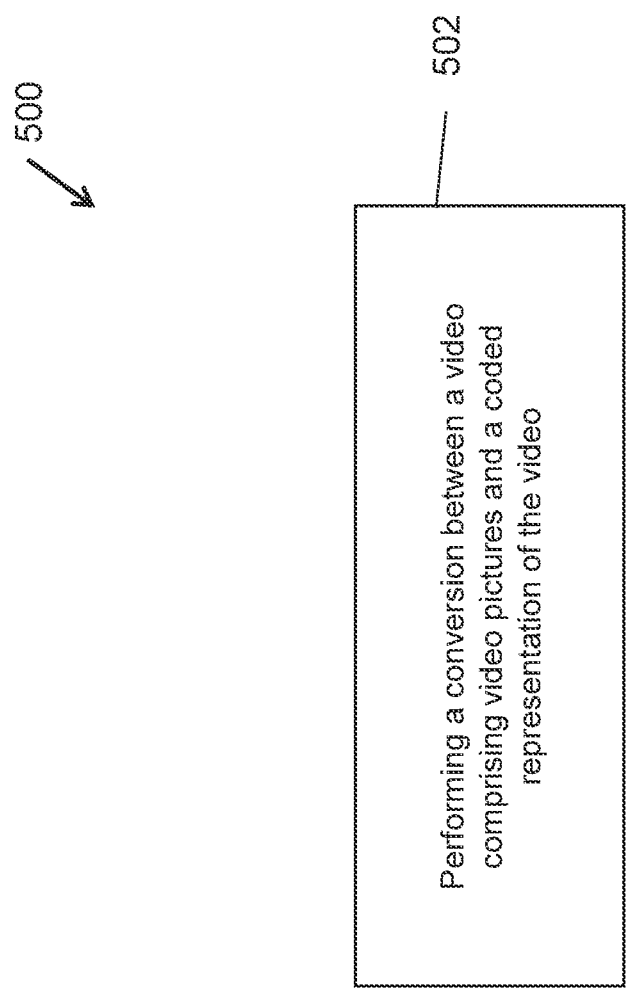
FIG. 5 is a flowchart for an example method of video processing.

FIG. 4 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 6:
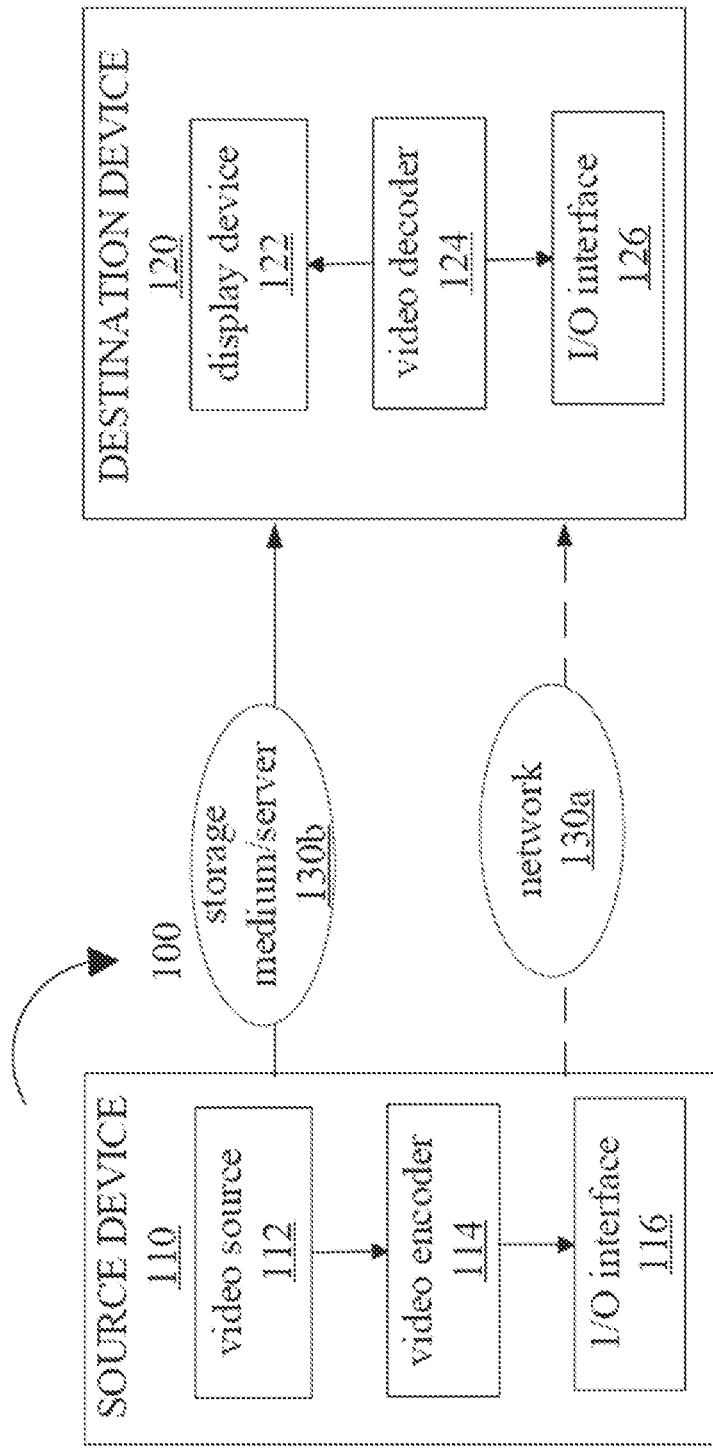
FIG. 6 is a block diagram that illustrates a video coding system in accordance with some embodiments of the present disclosure.

FIG. 6 is a block diagram that illustrates an example video coding system 100 that may utilize the techniques of this disclosure.

As shown in FIG. 6, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 7:
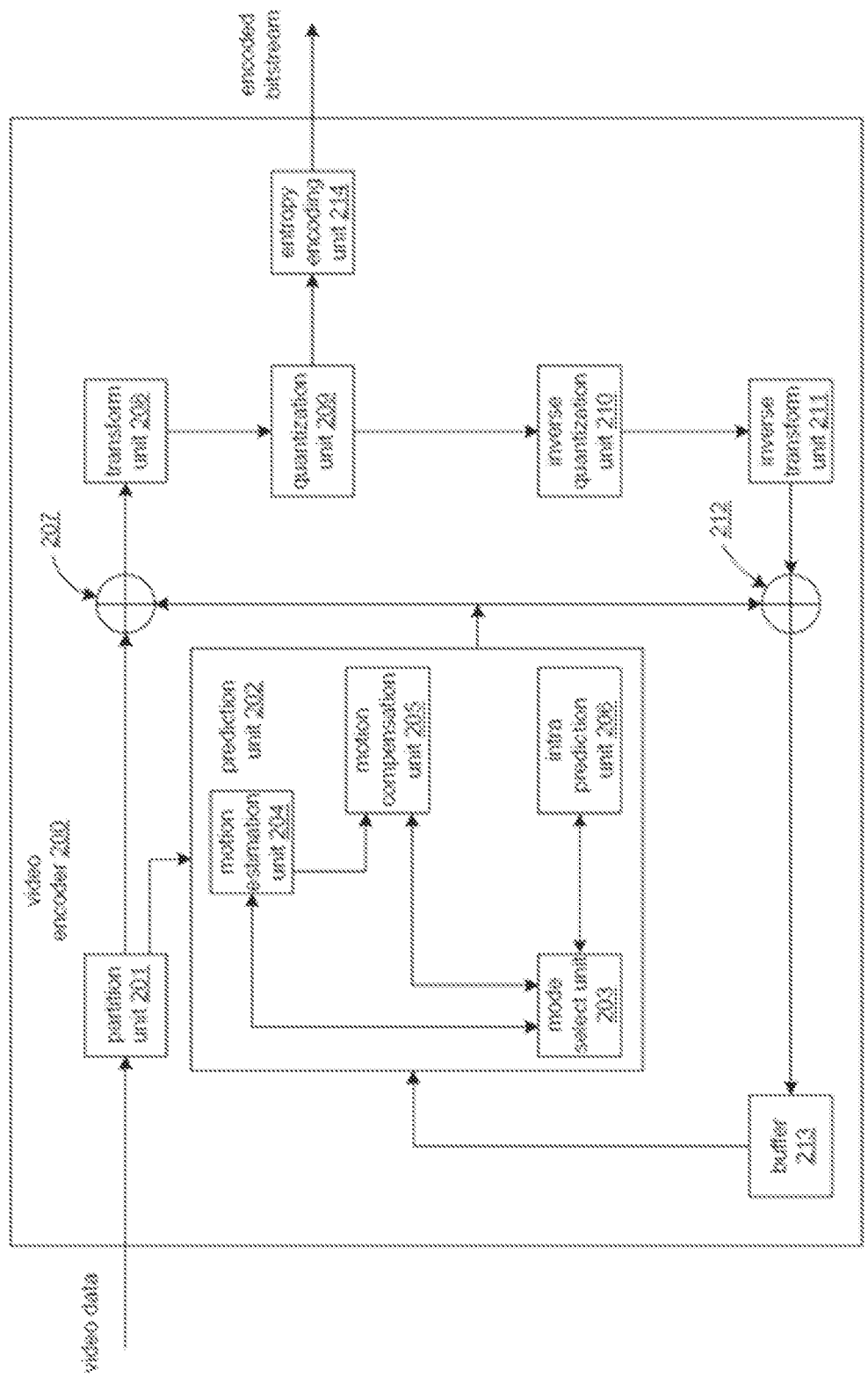
FIG. 7 is a block diagram that illustrates an encoder in accordance with some embodiments of the present disclosure.

FIG. 7 is a block diagram illustrating an example of video encoder 200, which may be video encoder 114 in the system 100 illustrated in FIG. 6.

Video encoder 200 may be configured to perform any or all of the techniques of this disclosure. In the example of FIG. 7, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 7 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream (or the bitstream representation) of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream of the video to the block of video will be performed using the video processing tool or mode that was enabled based on the decision or determination.

Figure 8:
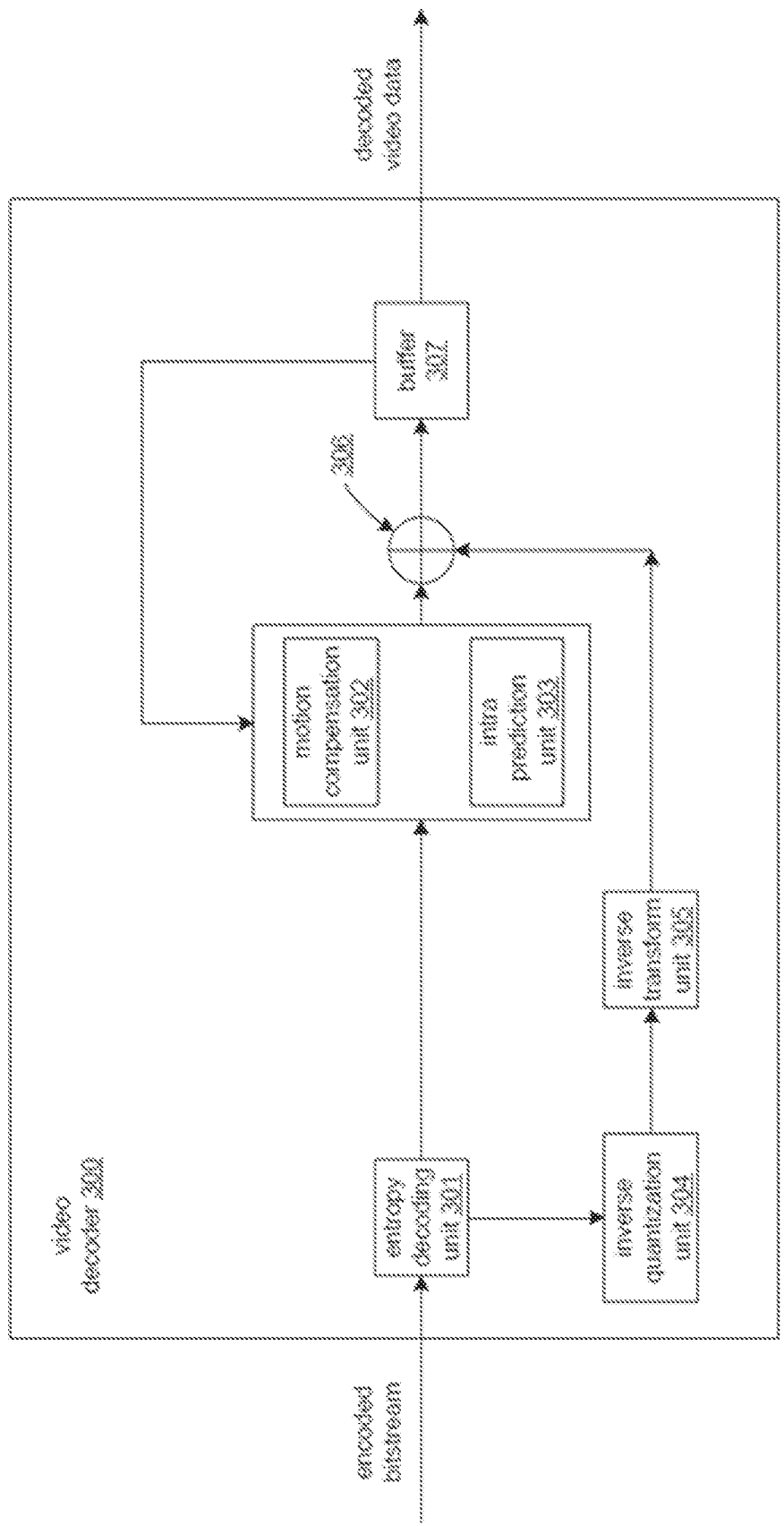
FIG. 8 is a block diagram that illustrates a decoder in accordance with some embodiments of the present disclosure.

FIG. 8 is a block diagram illustrating an example of video decoder 300 which may be video decoder 124 in the system 100 illustrated in FIG. 6.

The video decoder 300 may be configured to perform any or all of the techniques of this disclosure. In the example of FIG. 8, the video decoder 300 includes a plurality of functional components. The techniques described in this disclosure may be shared among the various components of the video decoder 300. In some examples, a processor may be configured to perform any or all of the techniques described in this disclosure.

In the example of FIG. 8, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 7).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 9:
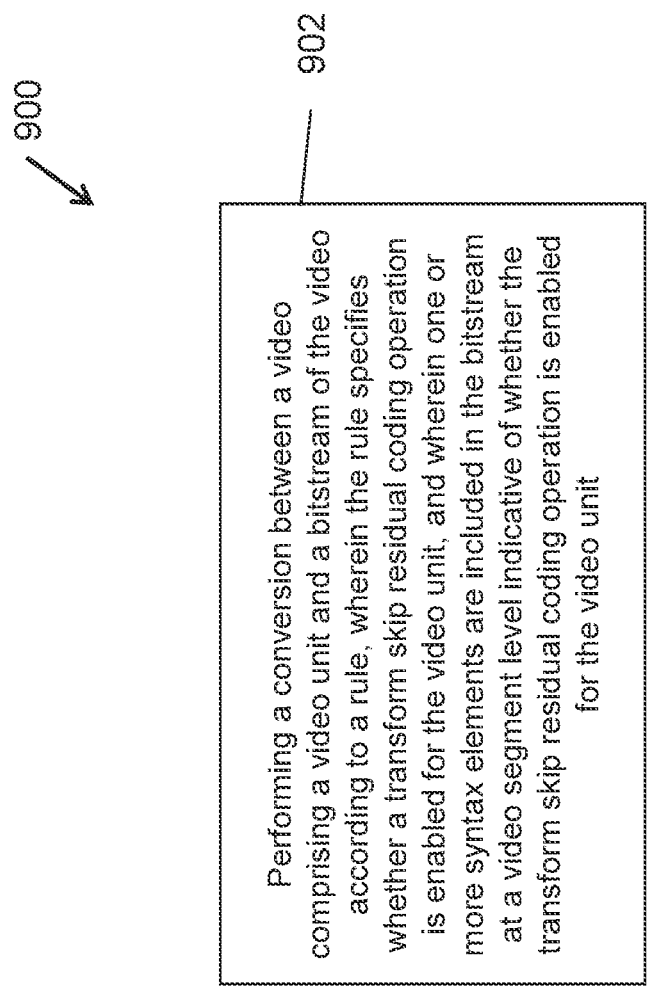
FIGS. 9 to 19 are flowcharts for example methods of video processing.

FIG. 9 is a flowchart for an example method 900 of video processing. Operation 902 includes performing a conversion between a video comprising a video unit and a bitstream of the video according to a rule, wherein the rule specifies whether a transform skip residual coding operation is enabled for the video unit, and wherein one or more syntax elements are included in the bitstream at a video segment level indicative of whether the transform skip residual coding operation is enabled for the video unit.

In some embodiments of method 900, the video unit includes a coded layer video sequence (CLVS), a group of pictures, a picture, a slice, a tile, a coding tree unit (CTU) row, a CTU, a coding unit (CU), a picture unit (PU), or a transform unit (TU). In some embodiments of method 900, the video segment level includes a sequence parameter set (SPS) level, a picture parameter set (PPS) level, a picture header (PH) level, a slice header (SH) level, a video block level, a coding unit (CU) level, or a transform unit (TU) level. In some embodiments of method 900, the rule specifies that the one or more syntax elements include a first syntax element that indicates whether the transform skip residual coding operation is enabled for the video unit is conditionally included in either the PH level or the SH level. In some embodiments of method 900, the rule specifies that whether the first syntax element is included in the bitstream in either the PH level or the SH level is based on a second syntax element included in the PPS level or the SPS level.

In some embodiments of method 900, the rule specifies that a third syntax element that indicates whether the transform skip residual coding operation is enabled for the video unit is not included in the SH level when the first syntax element is included in the PH level. In some embodiments of method 900, the rule specifies that when a third syntax element that indicates whether the transform skip residual coding operation is enabled for the video unit is absent from the SH level, a value of the third syntax element is inferred to be equal to the value of the first syntax element included in the PH level. In some embodiments of method 900, the rule specifies that the one or more syntax elements that indicate whether the transform skip residual coding operation is enabled for the video unit is indicated in both the PH level and the SH level. In some embodiments of method 900, the rule specifies that the one or more syntax elements include a first syntax element that indicates whether the transform skip residual coding operation is enabled for the video unit is not included in the SH level when the first syntax element in the PH level specifies that the transform skip residual coding operation is disabled for all slices referring to the PH level.

In some embodiments of method 900, the rule specifies that the one or more syntax elements include a first syntax element that indicates whether the transform skip residual coding operation is enabled for the video unit is included in the video block level or the CU level or the TU level, and wherein the first syntax element is coded with a context-adaptive arithmetic entropy-coded syntax element. In some embodiments of method 900, the context-adaptive arithmetic entropy-coded syntax element includes ae(v) coding. In some embodiments of method 900, the rule specifies that at least one of the one or more syntax elements that indicate whether the transform skip residual coding operation is enabled for the video unit is included in the SPS level or the PPS level or the PH level or the SH level and is coded with an unsigned integer using n bits, wherein n is an integer. In some embodiments of method 900, n is equal to 1.

In some embodiments of method 900, the rule specifies that whether the one or more syntax elements include a first syntax element that indicates whether the transform skip residual coding operation is enabled for the video unit is included in the bitstream is based on whether a transform skip operation is enabled or used for the video unit. In some embodiments of method 900, the rule specifies that when the transform skip operation is disabled at the SPS level, a value of the first syntax element in the PPS level indicates that the transform skip residual coding operation is disabled for pictures referring to a current PPS. In some embodiments of method 900, the first syntax element is included in the bitstream at a first video segment level, wherein the rule specifies that due to the transform skip operation being disabled at a second video segment level, the first syntax element indicative of disabling of the transform skip residual coding operation is omitted from the bitstream, and wherein the first video segment level is lower than or same as the second video segment level.

In some embodiments of method 900, the first video segment level includes the SPS level, the PH level, the SH level, the video block level, the CU level, or the TU level. In some embodiments of method 900, the second video segment level includes the SPS level, or the PPS level. In some embodiments of method 900, the rule specifies that when the transform skip operation is enabled at the video segment level of the video but is not used for the video unit, a syntax element that indicates whether the transform skip residual coding operation is enabled for the video unit is not included in the bitstream. In some embodiments of method 900, the video segment level includes the SPS level, and wherein the video unit includes the TU.

In some embodiments of method 900, the rule specifies that when a syntax element that indicates whether the transform skip residual coding operation is enabled for the video unit is not included at the video segment level, a value of the syntax element is inferred to indicate that the transform skip residual coding operation is disabled for the video unit. In some embodiments of method 900, the rule specifies that whether a syntax element that indicates whether the transform skip residual coding operation is enabled for the video unit is included in the bitstream at a first video segment level of the video is based on a value of a second syntax element in the bitstream at a second video segment level of the video, and the second video segment level is higher than the first video segment level.

In some embodiments of method 900, the first video segment level includes the picture level or the slice level, the second video segment level includes the SPS level or the PPS level, and the syntax element is included in the bitstream at the picture level or the slice level based on whether the value of the syntax indicates that the transform skip residual coding operation is enabled at the SPS level or the PPS level. In some embodiments of method 900, the first video segment level includes the video block level, or the CU level, or the TU level, the second video segment level includes the SPS level, the PPS level, the picture level, or the slice level, and the syntax element is included in the bitstream at the video block level, or the CU level, or the TU level based on whether the value of the syntax indicates that the transform skip residual coding operation is enabled at the SPS level, the PPS level, the picture level, or the slice level. In some embodiments of method 900, the rule specifies that when a value of a syntax element that indicates that the transform skip residual coding operation is disabled for the video unit at the second video segment level, the syntax element is not included at the first video segment level.

In some embodiments of method 900, the rule specifies that when the syntax element is absent from the bitstream, the syntax element is inferred to be a certain value. In some embodiments of method 900, the value of the syntax element at the PPS level is based on whether the transform skip residual coding operation is enabled at the SPS-level. In some embodiments of method 900, when the syntax element at the SPS level indicates that the transform skip residual coding operation is disabled for the CLVS, the value of the syntax element in the bitstream at the PPS level is equal to a certain value that specifies that the transform skip residual coding operation is disabled for pictures referring to a current PPS.

Figure 10:
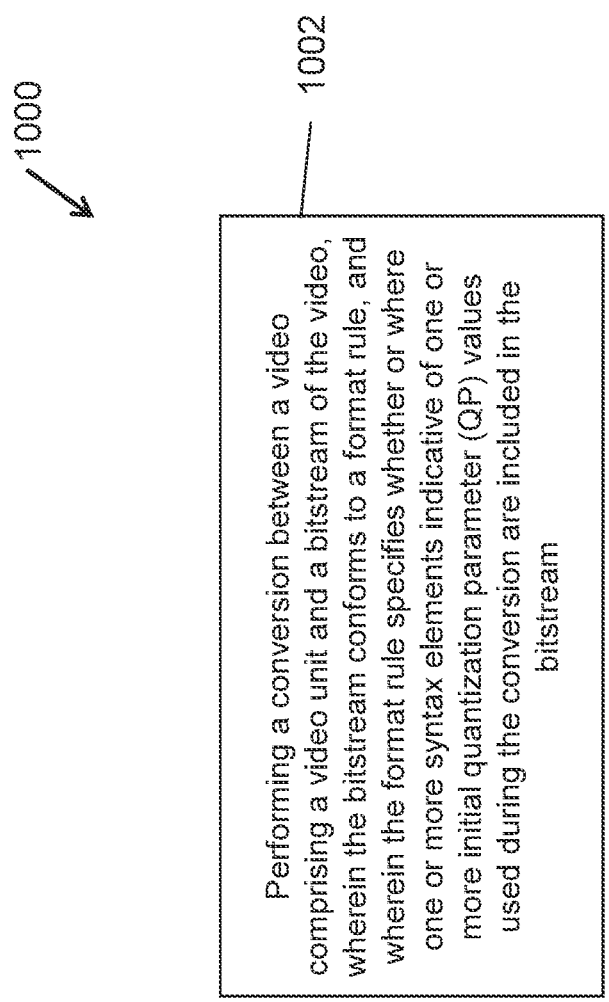

FIG. 10 is a flowchart for an example method 1000 of video processing. Operation 1002 includes performing a conversion between a video comprising a video unit and a bitstream of the video, wherein the bitstream conforms to a format rule, and wherein the format rule specifies whether or where one or more syntax elements indicative of one or more initial quantization parameter (QP) values used during the conversion are included in the bitstream.

In some embodiments of method 1000, the format rule specifies that a syntax element indicating the one or more initial QP values is included in a picture header without including the syntax element in a picture parameter set. In some embodiments of method 1000, the format rule specifies that a syntax element indicating the one or more initial QP values is included in a picture parameter set and repeated in one or more picture headers. In some embodiments of method 1000, the format rule specifies that a syntax element indicating the one or more initial QP values is included in a picture parameter set and repeated in one or more picture headers, and the format rule specifies that the one or more initial QP values included in the picture header overrides or updates the one or more initial QP values included in the picture parameter set by using a delta value in the bitstream. In some embodiments of method 1000, the format rule specifies that the one or more syntax elements are included in the bitstream at multiple video segment levels comprising two or more of a sequence parameter set (SPS), a picture parameter set (PPS), a picture header (PH), and a slice header (SH), and the format rule specifies that the one or more initial QP values included at a first video segment level is updated or overridden using the one or more initial QP values included at a second video segment level, the first video segment level is at a higher level than the second video segment level, and the one or more initial QP values at the first video segment level is coded with ue(v) and the one or more initial QP values at the second video segment level is coded with se(v).

In some embodiments of method 1000, the format rule specifies that the one or more syntax elements are included in the bitstream at multiple video segment levels comprising two or more of a sequence parameter set (SPS), a picture parameter set (PPS), a picture header (PH), and a slice header (SH) according to a rule. In some embodiments of method 1000, the rule specifies that each of the one or more syntax elements is based on a type of the video unit. In some embodiments of method 1000, the rule is based on a type of a picture or a slice of the video unit. In some embodiments of method 1000, the rule is based on a type of a video content of the video unit. In some embodiments of method 1000, the rule is based on a type of an index of a subpicture of the video unit or another identification of the subpicture. In some embodiments of method 1000, the rule is based on an index of a slice of the video unit or another identification information of the slice. In some embodiments of method 1000, the rule is based on a type of an index of a tile of the video unit or another identification information of the tile. In some embodiments of method 1000, the rule is based on a type of a transform of the video unit.

In some embodiments of method 1000, the format rule specifies that the one or more syntax elements are offset by K, wherein K is a number that is not equal to 26. In some embodiments of method 1000, K is less than 26. In some embodiments of method 1000, the format rule specifies that the one or more syntax elements are replaced by init_qp__minusK, and/or one or more values of the one or more syntax elements are in a range of −(K+QpBdOffset) to (63−K), inclusive, and wherein K is less than 26. In some embodiments of method 1000, K is greater than 26.

In some embodiments of method 1000, K is a function of a maximum allowed QP value and/or a minimum allowed QP value. In some embodiments of method 1000, K is based on a picture or a slice or a video block type of the video unit, and/or wherein K is based on a prediction mode and/or a bit depth of the video unit. In some embodiments of method 1000, the format rule specifies that the one or more syntax elements are offset by a number based on an internal bit depth of the video unit. In some embodiments of method 1000, the format rule specifies that the one or more syntax elements are offset by floor((−QpBdOffset+M)/2). In some embodiments of method 1000, the format rule specifies that the one or more syntax elements are offset by (floor((−QpBdOffset+M)/2)+K), wherein K is a constant number. In some embodiments of method 1000, the number is set to a maximum allowed QP value. In some embodiments of method 1000, M is set to a maximum allowed QP value.

Figure 11:
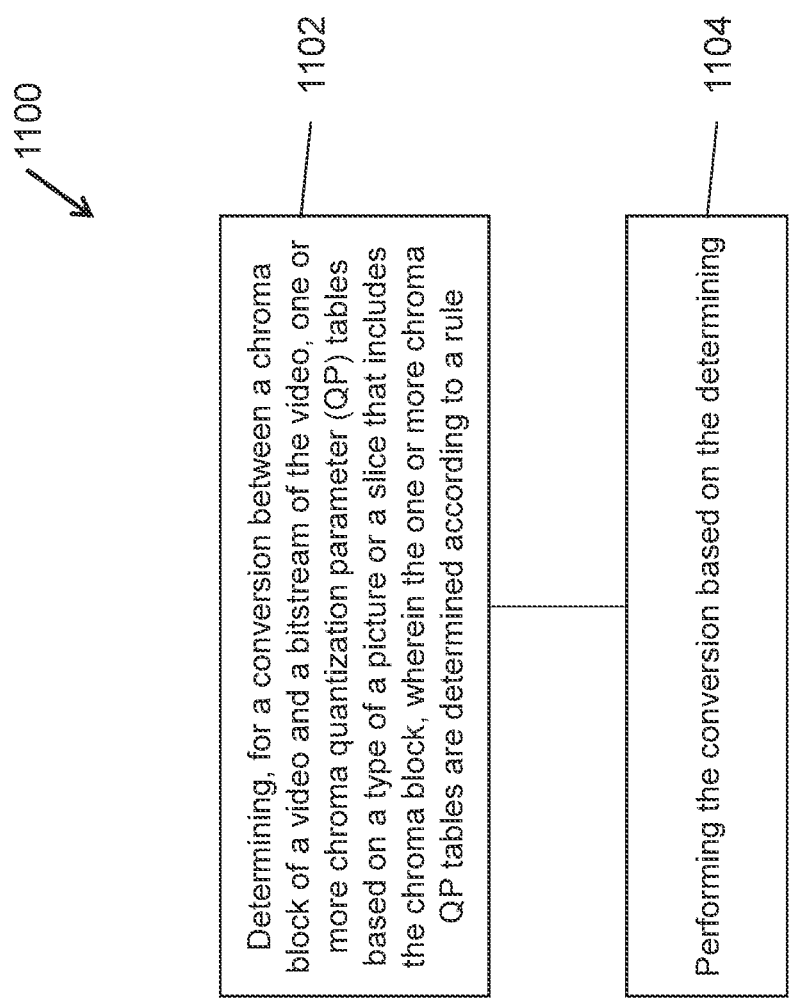

FIG. 11 is a flowchart for an example method 1100 of video processing. Operation 1102 includes determining, for a conversion between a chroma block of a video and a bitstream of the video, one or more chroma quantization parameter (QP) tables based on a type of a picture or a slice that includes the chroma block, wherein the one or more chroma QP tables are determined according to a rule. Operation 1104 includes performing the conversion based on the determining.

In some embodiments of method 1100, the rule specifies that each type of one or more pictures or one or more slices of the video is associated with a different chroma QP table. In some embodiments of method 1100, the rule specifies that I pictures or slices are associated with chroma QP tables specifically for the I pictures or slices. In some embodiments of method 1100, the rule specifies that I, B, and P pictures or slices are associated with chroma QP tables specifically for the I, B, and P pictures or slices. In some embodiments of method 1100, the rule specifies that B and P pictures or slices are associated with a same set of chroma QP tables. In some embodiments of method 1100, the rule specifies that one or more pictures or one or more slices of the video are classified into M cases, and the rule specifies that a number of the one or more chroma QP tables to be included in the bitstream is based on M.

Figure 12:
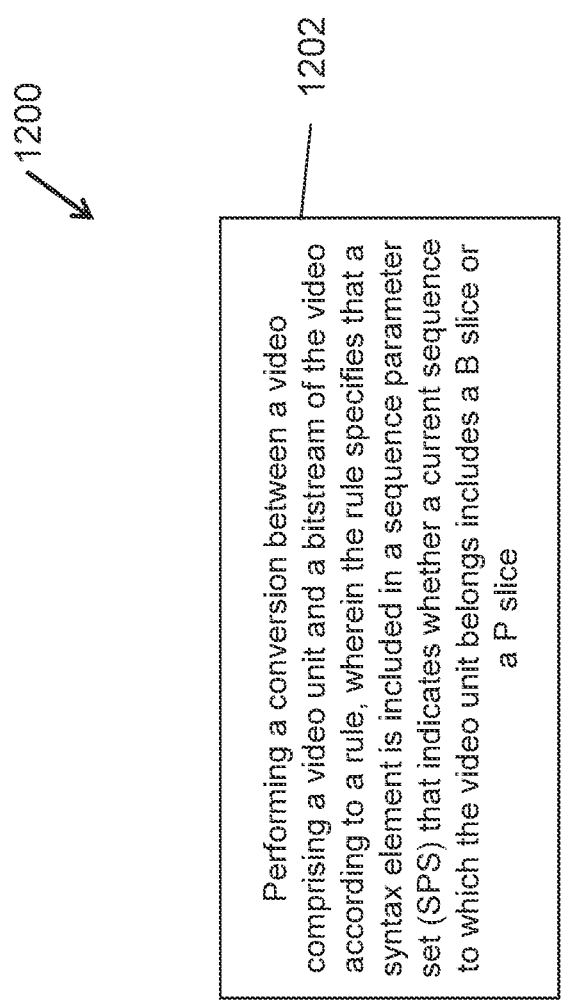

FIG. 12 is a flowchart for an example method 1200 of video processing. Operation 1202 includes performing a conversion between a video comprising a video unit and a bitstream of the video according to a rule, wherein the rule specifies that a syntax element is included in a sequence parameter set (SPS) that indicates whether a current sequence to which the video unit belongs includes a B slice or a P slice.

Figure 13:
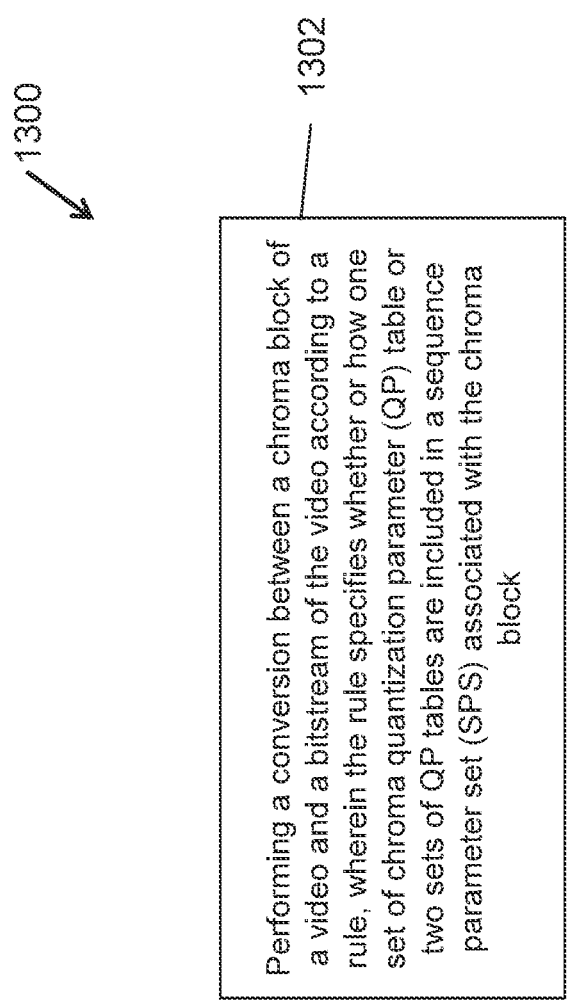

FIG. 13 is a flowchart for an example method 1300 of video processing. Operation 1302 includes performing a conversion between a chroma block of a video and a bitstream of the video according to a rule, wherein the rule specifies whether or how one set of chroma quantization parameter (QP) table or two sets of QP tables are included in a sequence parameter set (SPS) associated with the chroma block.

In some embodiments of method 1300, the SPS includes a syntax element that indicates whether the one set QP table or the two sets of QP tables are included in the SPS. In some embodiments of method 1300, the bitstream includes the syntax element when a ChromaArrayType is not equal to zero.

Figure 14:
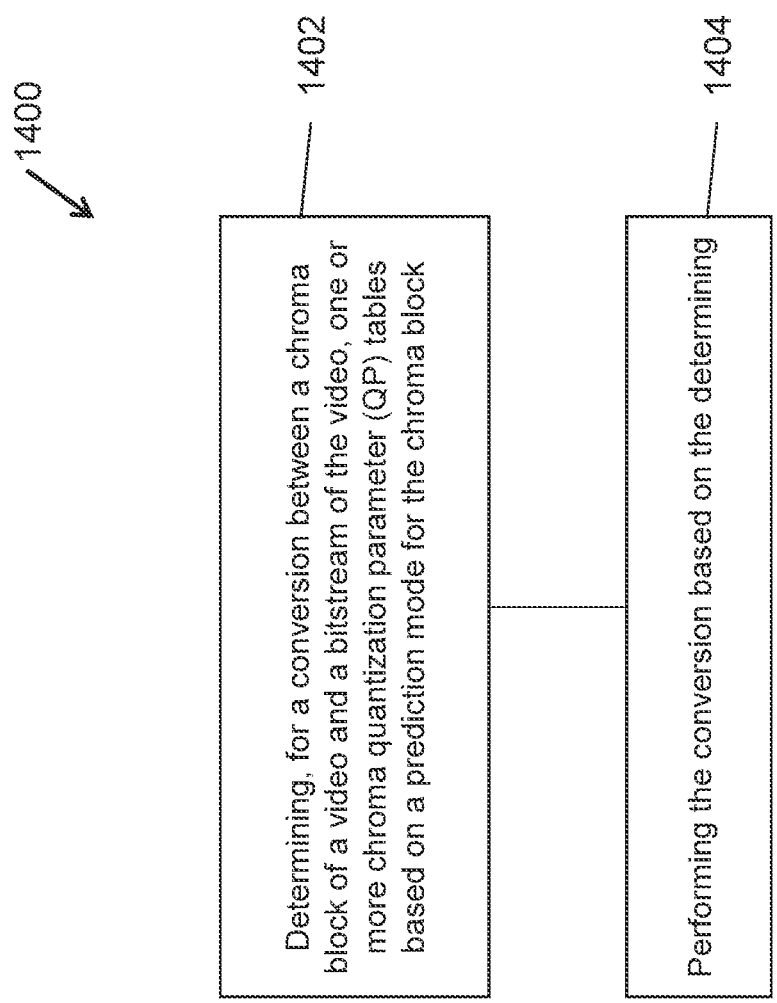

FIG. 14 is a flowchart for an example method 1400 of video processing. Operation 1402 includes determining, for a conversion between a chroma block of a video and a bitstream of the video, one or more chroma quantization parameter (QP) tables based on a prediction mode for the chroma block. Operation 1404 includes performing the conversion based on the determining.

In some embodiments of method 1400, an intra coding unit (CU) and other CUs have a different set of chroma QP tables.

Figure 15:
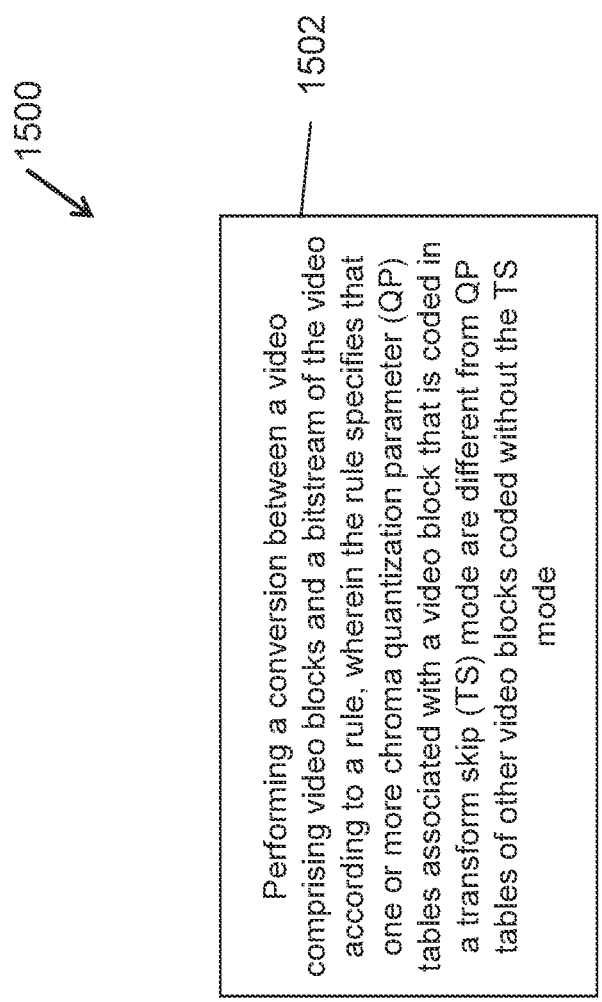

FIG. 15 is a flowchart for an example method 1500 of video processing. Operation 1502 includes performing a conversion between a video comprising video blocks and a bitstream of the video according to a rule, wherein the rule specifies that one or more chroma quantization parameter (QP) tables associated with a video block that is coded in a transform skip (TS) mode are different from QP tables of other video blocks coded without the TS mode.

In some embodiments of method 1500, the video block includes a luma video block.

Figure 16:
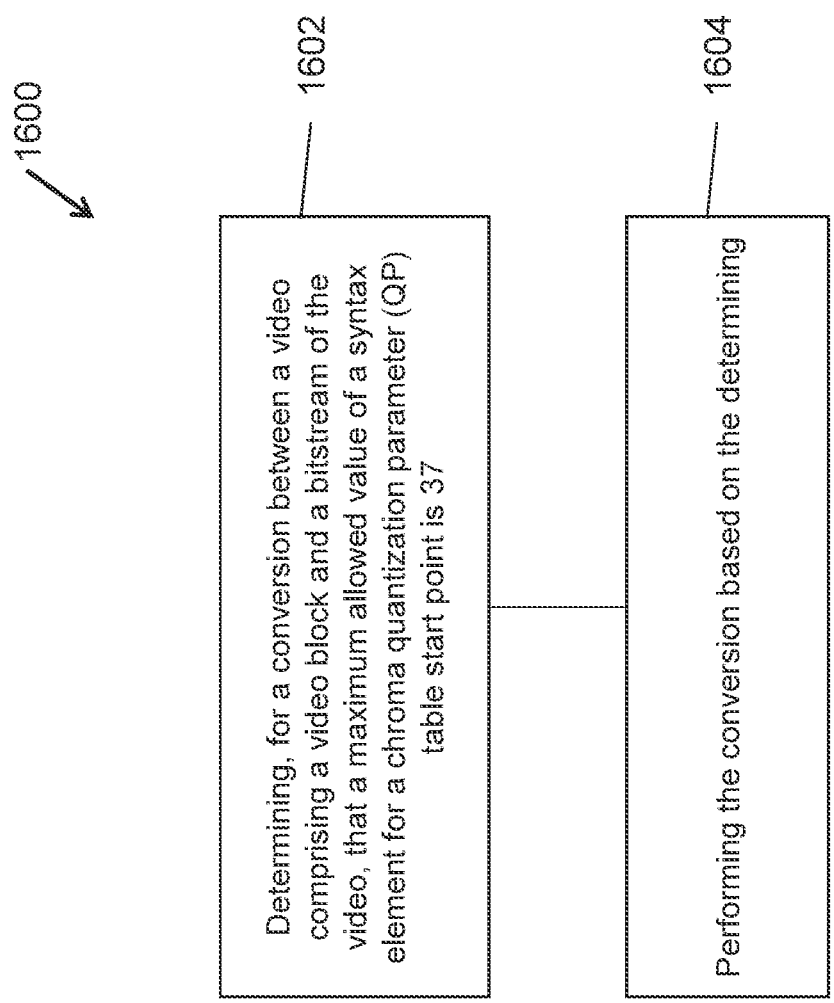

FIG. 16 is a flowchart for an example method 1600 of video processing. Operation 1602 includes determining, for a conversion between a video comprising a video block and a bitstream of the video, that a maximum allowed value of a syntax element for a chroma quantization parameter (QP) table start point is 37. Operation 1604 includes performing the conversion based on the determining.

Figure 17:
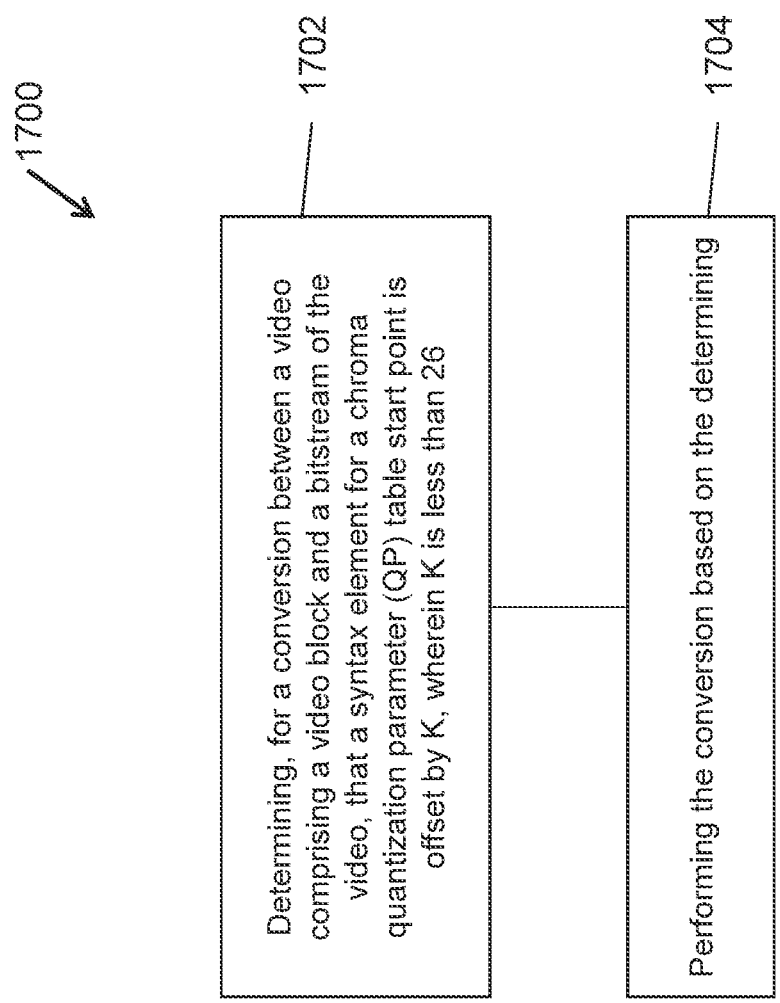

FIG. 17 is a flowchart for an example method 1700 of video processing. Operation 1702 includes determining, for a conversion between a video comprising a video block and a bitstream of the video, that a syntax element for a chroma quantization parameter (QP) table start point is offset by K, wherein K is less than 26. Operation 1704 includes performing the conversion based on the determining.

In some embodiments of method 1700, K is zero.

Figure 18:
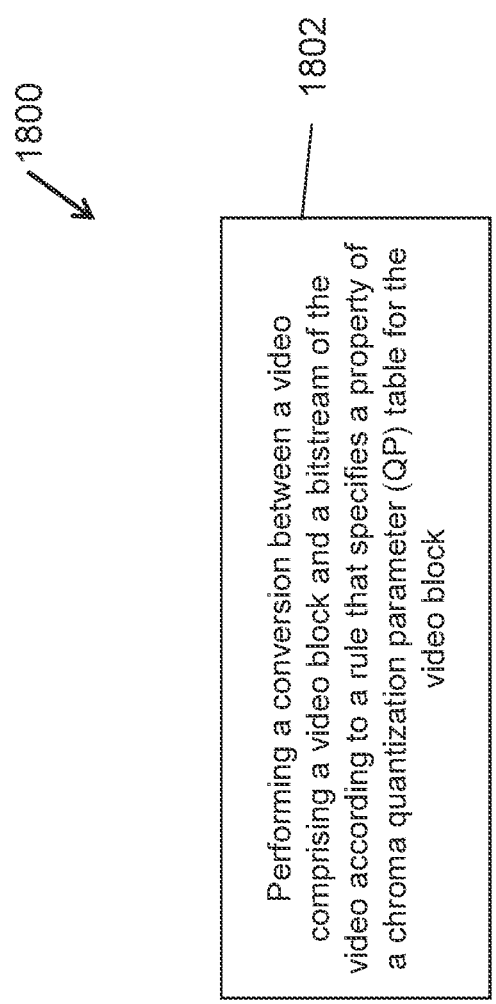

FIG. 18 is a flowchart for an example method 1800 of video processing. Operation 1802 includes performing a conversion between a video comprising a video block and a bitstream of the video according to a rule that specifies a property of a chroma quantization parameter (QP) table for the video block.

In some embodiments of method 1800, the rule specifies that a syntax element for a start point of the chroma QP table is offset by a value that is based on whether a current video picture to which the video block belongs is an intra only picture. In some embodiments of method 1800, the rule specifies that a number of pivot points in the chroma QP table for the video block is one of: (1) the number is zero, or (2) the number is a non-negative number, or (3) an i-th entry in the chroma QP table is equal to an i-th entry of a corresponding luma QP table when the number of pivot points in the chroma QP table is zero, or (4) an i-th entry in the chroma QP table is equal to an i-th entry of a corresponding luma QP table plus an offset when the number of pivot points in the chroma QP table is zero. In some embodiments of method 1800, the rule specifies that whether to parse a start point of the chroma QP table is based on whether a number of pivot points is zero. In some embodiments of method 1800, the rule specifies that the chroma QP table for the video block is determined by performing an exclusive-OR (XOR) operation between (delta_qp_in_val_minus1[i][j]+1) and delta_qp_diff_val[i][j]. In some embodiments of method 1800, the rule specifies that a quantization parameter (QP) clipping operation is applied to an index of the chroma QP table or to mapped chroma QPs in the chroma QP table.

In some embodiments of method 1800, the rule specifies that a range to apply for the QP clipping operation is from −QpBdOffset to 63, inclusive. In some embodiments of method 1800, the rule specifies that one or more chroma QP tables that include the chroma QP table are included in both a sequence parameter set (SPS) and a picture parameter set (PPS). In some embodiments of method 1800, the rule specifies that one or more chroma QP tables that include the chroma QP table are included in a picture header (PH) or a slice header (SH).

Figure 19:
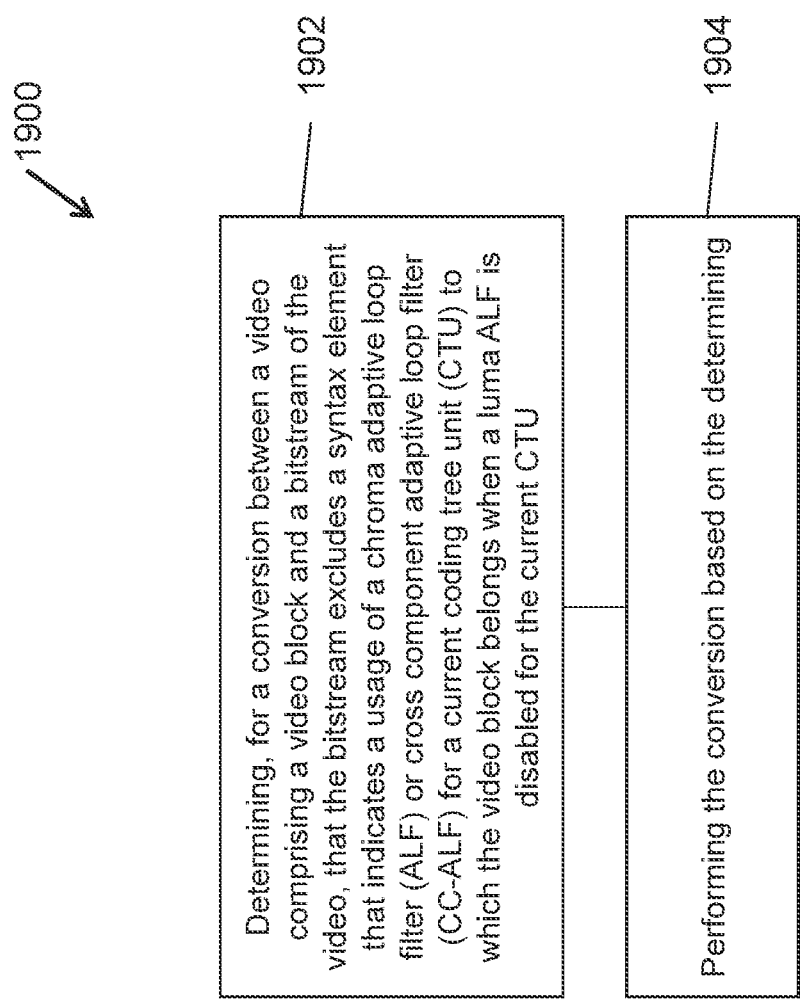

FIG. 19 is a flowchart for an example method 1900 of video processing. Operation 1902 includes determining, for a conversion between a video comprising a video block and a bitstream of the video, that the bitstream excludes a syntax element that indicates a usage of a chroma adaptive loop filter (ALF) or cross component adaptive loop filter (CC-ALF) for a current coding tree unit (CTU) to which the video block belongs when a luma ALF is disabled for the current CTU. Operation 1904 includes performing the conversion based on the determining.

In some embodiments of method 1900, the chroma ALF or CC-ALF is inferred to be disabled for the current CTU when the luma ALF is disabled for the current CTU.

In some embodiments of any one or more of methods 900-1900, the performing the conversion comprising encoding the video into the bitstream. In some embodiments of any one or more of methods 900-1900, the performing the conversion comprises generating the bitstream from the video, and the method further comprises storing the bitstream in a non-transitory computer-readable recording medium. In some embodiments of any one or more of methods 900-1900, the performing the conversion comprises decoding the video from the bitstream.

In some embodiments, a video decoding apparatus comprising a processor configured to implement operations for method(s) 900-1990. In some embodiments, a video encoding apparatus comprising a processor configured to implement operations for method(s) 900-1990. In some embodiments, a computer program product having computer instructions stored thereon, the instructions, when executed by a processor, causes the processor to implement operations for method(s) 900-1990. In some embodiments, a non-transitory computer-readable storage medium that stores a bitstream generated according to the operations for method (s) 900-1990. In some embodiments, a non-transitory computer-readable storage medium storing instructions that cause a processor to implement operations for method(s) 900-1990. In some embodiments, a method of bitstream generation, comprising: generating a bitstream of a video according to operations for method(s) 900-1990, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (CD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video comprising a first video unit and a bitstream of the video according to a rule,
wherein the rule specifies that a first syntax element that indicates whether a transform skip residual coding syntax structure is disabled for residual samples of the first video unit which is coded with a transform skip mode is conditionally included in a slice header (SH) in the bitstream, based on a second syntax element included in a sequence parameter set (SPS).

2. The method of claim 1, wherein the rule specifies that the first syntax element included in the SH is coded with an unsigned integer using n bits, wherein n is an integer.

3. The method of claim 2, wherein n is equal to 1.

4. The method of claim 1, wherein the second syntax element indicates that whether the transform skip mode is enabled for video units referring to the SPS.

5. The method of claim 4, wherein when a value of the second syntax element indicates that the transform skip mode is disabled for the video units referring to the SPS, the first syntax element is omitted from the bitstream.

6. The method of claim 1, wherein whether the transform skip residual coding syntax structure is disabled for the residual samples of the first video unit is further based on whether a dependent quantization is used for the first video unit, and wherein in the dependent quantization, a set of admissible reconstruction values for a transform coefficient depends on values of the transform coefficient levels that precede a current transform coefficient level in reconstruction order.

7. The method of claim 1, wherein the rule specifies that for a second video unit of the video, when the second video unit is not coded with the transform skip mode or the transform skip residual coding syntax structure is disabled for residual samples of the second video unit, a non-transform-skip residual coding syntax structure is used for the second video unit; otherwise, the transform skip residual coding syntax structure is used for the second video unit.

8. The method of claim 1, wherein the performing the conversion comprises encoding the video into the bitstream.

9. The method of claim 1, wherein the performing the conversion comprises decoding the video from the bitstream.

10. An apparatus for processing video data comprising a processor and a non-transitory memory with instructions thereon, wherein the instructions upon execution by the processor, cause the processor to:
perform a conversion between a video comprising a first video unit and a bitstream of the video according to a rule,
wherein the rule specifies that a first syntax element that indicates whether a transform skip residual coding syntax structure is disabled for residual samples of the first video unit which is coded with a transform skip mode is conditionally included in a slice header (SH) in the bitstream, based on a second syntax element included in a sequence parameter set (SPS).

11. The apparatus of claim 10, wherein the rule specifies that the first syntax element included in the SH is coded with an unsigned integer using n bits, wherein n is an integer,
wherein n is equal to 1,
wherein the second syntax element indicates that whether the transform skip mode is enabled for units referring to the SPS, and
wherein when a value of the second syntax element indicates that the transform skip mode is disabled for video units referring to the SPS, the first syntax element is omitted from the bitstream.

12. The apparatus of claim 10, wherein whether the transform skip residual coding syntax structure is disabled for the residual samples of the first video unit is further based on whether a dependent quantization is used for the first video unit, and wherein in the dependent quantization, a set of admissible reconstruction values for a transform coefficient depends on values of the transform coefficient levels that precede a current transform coefficient level in reconstruction order.

13. The apparatus of claim 10, wherein the rule specifies that for a second video unit of the video, when the second video unit is not coded with the transform skip mode or the transform skip residual coding syntax structure is disabled for residual samples of the second video unit, a non-transform-skip residual coding syntax structure is used for the second video unit; otherwise, the transform skip residual coding syntax structure is used for the second video unit.

14. A non-transitory computer-readable storage medium storing instructions that cause a processor to:
perform a conversion between a video comprising a first video unit and a bitstream of the video according to a rule,
wherein the rule specifies that a first syntax element that indicates whether a transform skip residual coding syntax structure is disabled for residual samples of the first video unit which is coded with a transform skip mode is conditionally included in a slice header (SH) in the bitstream, based on a second syntax element included in a sequence parameter set (SPS).

15. The non-transitory computer-readable storage medium of claim 14, wherein the rule specifies that the first syntax element included in the SH is coded with an unsigned integer using n bits, wherein n is an integer,
wherein n is equal to 1,
wherein the second syntax element indicates that whether the transform skip mode is enabled for units referring to the SPS, and
wherein when a value of the second syntax element indicates that the transform skip mode is disabled for video units referring to the SPS, the first syntax element is omitted from the bitstream.

16. The non-transitory computer-readable storage medium of claim 14, wherein whether the transform skip residual coding syntax structure is disabled for the residual samples of the first video unit is further based on whether a dependent quantization is used for the first video unit, and wherein in the dependent quantization, a set of admissible reconstruction values for a transform coefficient depends on values of the transform coefficient levels that precede a current transform coefficient level in reconstruction order.

17. The non-transitory computer-readable storage medium of claim 14, wherein the rule specifies that for a second video unit of the video, when the second video unit is not coded with the transform skip mode or the transform skip residual coding syntax structure is disabled for residual samples of the second video unit, a non-transform-skip residual coding syntax structure is used for the second video unit; otherwise, the transform skip residual coding syntax structure is used for the second video unit.

18. A non-transitory computer-readable recording medium storing a bitstream of a video which is generated by a method performed by a video processing apparatus, wherein the method comprises:
generating the bitstream, for the video comprising a first video unit, according to a rule,
wherein the rule specifies that a first syntax element that indicates whether a transform skip residual coding syntax structure is disabled for residual samples of the first video unit which is coded with a transform skip mode is conditionally included in a slice header (SH) in the bitstream, based on a second syntax element included in a sequence parameter set (SPS).

19. The non-transitory computer-readable recording medium of claim 18, wherein the rule specifies that the first syntax element included in the SH is coded with an unsigned integer using n bits, wherein n is an integer,
wherein n is equal to 1,
wherein the second syntax element indicates that whether the transform skip mode is enabled for units referring to the SPS, and
wherein when a value of the second syntax element indicates that the transform skip mode is disabled for video units referring to the SPS, the first syntax element is omitted from the bitstream.

20. The non-transitory computer-readable recording medium of claim 18, wherein whether the transform skip residual coding syntax structure is disabled for the residual samples of the first video unit is further based on whether a dependent quantization is used for the first video unit, and wherein in the dependent quantization, a set of admissible reconstruction values for a transform coefficient depends on values of the transform coefficient levels that precede a current transform coefficient level in reconstruction order, and
wherein the rule specifies that for a second video unit of the video, when the second video unit is not coded with the transform skip mode or the transform skip residual coding syntax structure is disabled for residual samples of the second video unit, a non-transform-skip residual coding syntax structure is used for the second video unit; otherwise, the transform skip residual coding syntax structure is used for the second video unit.

* * * * *